United States Patent
Tidwell

(10) Patent No.: US 10,051,305 B2
(45) Date of Patent: Aug. 14, 2018

(54) APPARATUS AND METHODS FOR ENABLING MEDIA OPTIONS IN A CONTENT DELIVERY NETWORK

(71) Applicant: Time Warner Cable Enterprises LLC, New York, NY (US)

(72) Inventor: Justin Tidwell, Waxhaw, NC (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 15/483,964

(22) Filed: Apr. 10, 2017

(65) Prior Publication Data

US 2017/0280183 A1    Sep. 28, 2017

Related U.S. Application Data

(60) Division of application No. 14/789,671, filed on Jul. 1, 2015, now Pat. No. 9,621,939, which is a
(Continued)

(51) Int. Cl.
*H04N 21/472* (2011.01)
*H04N 21/2668* (2011.01)
(Continued)

(52) U.S. Cl.
CPC ..... *H04N 21/2668* (2013.01); *G06Q 30/0241* (2013.01); *H04N 21/2547* (2013.01);
(Continued)

(58) Field of Classification Search
CPC ........... H04N 21/25833; H04N 21/472; H04N 21/47214; H04N 21/4147; H04N 21/4334; H04N 21/4583; H04N 21/458
See application file for complete search history.

(56) References Cited

U.S. PATENT DOCUMENTS 4,521,881 A    6/1985    Stapleford et al.
4,546,382 A    10/1985   McKenna et al.
(Continued)

FOREIGN PATENT DOCUMENTS

WO    WO-0191474 A2    11/2001

OTHER PUBLICATIONS

Open Cable Specification entitled "Enhanced TV Binary Interchange Format 1 0" 0C-SP-ETV-131F1.0-106-110128 dated Jan. 28, 2011, 408 pages.
(Continued)

*Primary Examiner* — Robert J Hance
(74) *Attorney, Agent, or Firm* — Gazdzinski & Associates, PC

(57) ABSTRACT

Apparatus and methods for providing media options over a network. In one embodiment, the media options are presented in conjunction with a promotion or advertisement for particular content. The precise ones of a plurality of disclosed options that will be presented may be determined based at least in part on a campaign established by a content management entity and a current availability of the content. For example, certain media options may only be made available for content that is currently available, while other options may be only available for content available at a future date/time, or during a particular time window. Rules for determining which options are to be provided in conjunction with which content and/or advertisements are established and by a content management entity, such as an entity of a multiple systems operator (MSO).

23 Claims, 21 Drawing Sheets

Related U.S. Application Data continuation of application No. 13/445,775, filed on Apr. 12, 2012, now Pat. No. 9,078,040.

(51) Int. Cl.

| | | |
|---|---|---|
| *H04N 21/2547* | (2011.01) | |
| *H04N 21/4725* | (2011.01) | |
| *H04N 21/262* | (2011.01) | |
| *H04N 21/858* | (2011.01) | |
| *G06Q 30/02* | (2012.01) | |
| *H04N 21/458* | (2011.01) | |
| *H04N 21/81* | (2011.01) | |
| *H04N 21/258* | (2011.01) | |
| *H04N 21/4147* | (2011.01) | |
| *H04N 21/433* | (2011.01) | |

(52) U.S. Cl.
CPC . *H04N 21/25833* (2013.01); *H04N 21/26283* (2013.01); *H04N 21/4147* (2013.01); *H04N 21/4334* (2013.01); *H04N 21/458* (2013.01); *H04N 21/4583* (2013.01); *H04N 21/472* (2013.01); *H04N 21/4725* (2013.01); *H04N 21/47214* (2013.01); *H04N 21/812* (2013.01); *H04N 21/8583* (2013.01)

(56) References Cited

U.S. PATENT DOCUMENTS

| | | |
|---|---|---|
| 4,602,279 A | 7/1986 | Freeman |
| 4,905,080 A | 2/1990 | Watanabe et al. |
| 4,930,120 A | 5/1990 | Baxter et al. |
| 5,155,591 A | 10/1992 | Wachob |
| 5,373,315 A | 12/1994 | Dufresne et al. |
| 5,481,294 A | 1/1996 | Thomas et al. |
| 5,497,185 A | 3/1996 | Dufresne et al. |
| 5,600,364 A | 2/1997 | Hendricks et al. |
| 5,675,647 A | 10/1997 | Garneau et al. |
| 5,758,257 A | 5/1998 | Herz et al. |
| 5,774,170 A | 6/1998 | Hite et al. |
| 5,793,409 A | 8/1998 | Tetsumura |
| 5,812,642 A | 9/1998 | Leroy |
| 5,862,312 A | 1/1999 | Mann et al. |
| 5,914,945 A | 6/1999 | Abu-Amara et al. |
| 5,929,849 A | 7/1999 | Kikinis |
| 5,956,037 A | 9/1999 | Osawa et al. |
| 5,963,844 A | 10/1999 | Dail |
| 5,974,299 A | 10/1999 | Massetti |
| 6,002,393 A | 12/1999 | Hite et al. |
| 6,029,045 A | 2/2000 | Picco et al. |
| 6,047,327 A | 4/2000 | Tso et al. |
| 6,081,830 A | 6/2000 | Schindler |
| 6,088,722 A | 7/2000 | Herz et al. |
| 6,124,878 A | 9/2000 | Adams et al. |
| 6,134,532 A | 10/2000 | Lazarus et al. |
| 6,161,142 A | 12/2000 | Wolfe et al. |
| 6,169,728 B1 | 1/2001 | Perreault et al. |
| 6,177,931 B1 | 1/2001 | Alexander et al. |
| 6,182,050 B1 | 1/2001 | Ballard |
| 6,202,210 B1 | 3/2001 | Ludtke |
| 6,211,901 B1 | 4/2001 | Imajima et al. |
| 6,216,129 B1 | 4/2001 | Eldering |
| 6,272,176 B1 | 8/2001 | Srinivasan |
| 6,282,713 B1 | 8/2001 | Kitsukawa et al. |
| 6,292,624 B1 * | 9/2001 | Saib .................. H04N 5/44543 348/14.01 |
| 6,330,609 B1 | 12/2001 | Garofalakis et al. |
| 6,389,538 B1 | 5/2002 | Gruse et al. |
| 6,396,055 B1 | 5/2002 | Biedendorf |
| 6,446,261 B1 | 9/2002 | Rosser |
| 6,463,585 B1 | 10/2002 | Hendricks et al. |
| 6,467,089 B1 | 10/2002 | Aust et al. |
| 6,502,076 B1 | 12/2002 | Smith |
| 6,549,718 B1 | 4/2003 | Grooters et al. |
| 6,560,578 B2 | 5/2003 | Eldering |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,647,548 B1 | 11/2003 | Lu et al. |
| 6,671,736 B2 | 12/2003 | Virine et al. |
| 6,681,393 B1 | 1/2004 | Bauminger et al. |
| 6,687,735 B1 | 2/2004 | Logston et al. |
| 6,700,624 B2 | 3/2004 | Yun |
| 6,704,930 B1 | 3/2004 | Eldering et al. |
| 6,718,551 B1 | 4/2004 | Swix et al. |
| 6,725,461 B1 * | 4/2004 | Dougherty ............. H04N 7/088 348/E7.031 |
| 6,738,978 B1 | 5/2004 | Hendricks et al. |
| 6,742,187 B1 | 5/2004 | Vogel |
| 6,771,290 B1 | 8/2004 | Hoyle |
| 6,775,843 B1 | 8/2004 | McDermott |
| 6,785,901 B1 | 8/2004 | Horiwitz et al. |
| 6,813,776 B2 | 11/2004 | Chernock et al. |
| 6,859,845 B2 | 2/2005 | Mate |
| 6,898,762 B2 | 5/2005 | Ellis et al. |
| 6,901,606 B2 | 5/2005 | Wright et al. |
| 6,909,837 B1 | 6/2005 | Unger |
| 6,915,528 B1 | 7/2005 | McKenna, Jr. |
| 6,990,680 B1 | 1/2006 | Wugofski |
| 7,017,179 B1 | 3/2006 | Asamoto et al. |
| 7,024,676 B1 | 4/2006 | Klopfenstein |
| 7,039,928 B2 | 5/2006 | Kamada et al. |
| 7,075,945 B2 | 7/2006 | Arsenault et al. |
| 7,100,183 B2 | 8/2006 | Kunkel et al. |
| 7,109,848 B2 | 9/2006 | Schybergson |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratripati et al. |
| 7,174,126 B2 | 2/2007 | McElhatten et al. |
| 7,191,461 B1 | 3/2007 | Arsenault et al. |
| 7,197,472 B2 | 3/2007 | Conkwright et al. |
| 7,213,036 B2 | 5/2007 | Apparao et al. |
| 7,222,078 B2 | 5/2007 | Abelow |
| 7,228,555 B2 | 6/2007 | Schlack |
| 7,237,250 B2 | 6/2007 | Kanojia et al. |
| 7,242,988 B1 | 7/2007 | Hoffberg et al. |
| 7,246,150 B1 | 7/2007 | Donoho et al. |
| 7,246,172 B2 | 7/2007 | Yoshiba et al. |
| 7,266,836 B2 | 9/2007 | Anttila et al. |
| 7,280,737 B2 | 10/2007 | Smith |
| 7,281,261 B2 | 10/2007 | Jaff et al. |
| 7,317,728 B2 | 1/2008 | Acharya et al. |
| 7,327,692 B2 | 2/2008 | Ain et al. |
| 7,352,775 B2 | 4/2008 | Powell |
| 7,355,980 B2 | 4/2008 | Bauer et al. |
| 7,356,751 B1 | 4/2008 | Levitan |
| 7,357,775 B1 | 4/2008 | Koh |
| 7,363,371 B2 | 4/2008 | Kirkby et al. |
| 7,363,643 B2 | 4/2008 | Drake et al. |
| 7,367,043 B2 | 4/2008 | Dudkiewicz et al. |
| 7,369,750 B2 | 5/2008 | Cheng et al. |
| 7,444,655 B2 | 10/2008 | Sardera |
| 7,457,520 B2 | 11/2008 | Rossetti et al. |
| 7,567,983 B2 | 7/2009 | Pickelsimer et al. |
| 7,577,118 B2 | 8/2009 | Haumonte et al. |
| 7,602,820 B2 | 10/2009 | Helms et al. |
| 7,603,529 B1 | 10/2009 | MacHardy et al. |
| 7,650,319 B2 | 1/2010 | Hoffberg et al. |
| 7,712,125 B2 | 5/2010 | Herigstad et al. |
| 7,720,432 B1 | 5/2010 | Colby et al. |
| 7,729,940 B2 | 6/2010 | Harvey et al. |
| 7,730,509 B2 | 6/2010 | Boulet et al. |
| 7,783,316 B1 | 8/2010 | Mitchell |
| 7,801,803 B2 | 9/2010 | Forlai |
| 7,900,052 B2 | 3/2011 | Jonas et al. |
| 7,900,229 B2 | 3/2011 | Dureau |
| 7,954,131 B2 | 5/2011 | Cholas et al. |
| 8,028,322 B2 | 9/2011 | Riedl et al. |
| 8,042,131 B2 | 10/2011 | Flickinger |
| 8,065,703 B2 | 11/2011 | Wilson et al. |
| 8,099,757 B2 | 1/2012 | Riedl et al. |

(56) References Cited

U.S. PATENT DOCUMENTS

| | | | |
|---|---|---|---|
| 8,156,520 B2 | 4/2012 | Casagrande et al. |
| 8,205,226 B2 | 6/2012 | Ko et al. |
| 8,214,256 B2 | 7/2012 | Riedl et al. |
| 8,296,185 B2 | 10/2012 | Isaac |
| 8,347,341 B2 | 1/2013 | Markley et al. |
| 8,365,213 B1 | 1/2013 | Orlowski |
| 8,396,055 B2 | 3/2013 | Patel et al. |
| 8,396,056 B2 | 3/2013 | Dalton, Jr. et al. |
| 8,484,511 B2 | 7/2013 | Engel et al. |
| 8,516,529 B2 | 8/2013 | Lajoie et al. |
| 8,561,113 B2 | 10/2013 | Cansler, Jr. et al. |
| 8,571,931 B2 | 10/2013 | Riedl et al. |
| 8,621,501 B2 | 12/2013 | Matheny et al. |
| 8,769,559 B2 | 7/2014 | Moon et al. |
| 9,215,423 B2 | 12/2015 | Kimble et al. |
| 2001/0001160 A1 | 5/2001 | Shoff et al. |
| 2001/0013123 A1 | 8/2001 | Freeman et al. |
| 2002/0026496 A1 | 2/2002 | Boyer et al. |
| 2002/0032754 A1 | 3/2002 | Logston et al. |
| 2002/0049902 A1 | 4/2002 | Rhodes |
| 2002/0059577 A1 | 5/2002 | Lu et al. |
| 2002/0059602 A1 | 5/2002 | MacRae et al. |
| 2002/0059619 A1 | 5/2002 | Lebar |
| 2002/0069404 A1 | 6/2002 | Copeman et al. |
| 2002/0073419 A1 | 6/2002 | Yen et al. |
| 2002/0078441 A1 | 6/2002 | Drake et al. |
| 2002/0078444 A1 | 6/2002 | Krewin et al. |
| 2002/0087975 A1 | 7/2002 | Schlack |
| 2002/0087976 A1 | 7/2002 | Kaplan et al. |
| 2002/0095684 A1 | 7/2002 | St. John et al. |
| 2002/0100063 A1 | 7/2002 | Herigstad et al. |
| 2002/0104083 A1 | 8/2002 | Hendricks et al. |
| 2002/0104096 A1 | 8/2002 | Cramer et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0129368 A1 | 9/2002 | Schlack et al. |
| 2002/0144263 A1 | 10/2002 | Eldering et al. |
| 2002/0147984 A1 | 10/2002 | Tomsen et al. |
| 2002/0154655 A1 | 10/2002 | Gummalla et al. |
| 2002/0163928 A1 | 11/2002 | Rudnick et al. |
| 2002/0166119 A1 | 11/2002 | Cristofalo |
| 2002/0174430 A1* | 11/2002 | Ellis ............... G11B 27/005 725/46 |
| 2002/0178445 A1 | 11/2002 | Eldering et al. |
| 2002/0178447 A1 | 11/2002 | Plotnick et al. |
| 2002/0184629 A1 | 12/2002 | Sie et al. |
| 2002/0184634 A1 | 12/2002 | Cooper |
| 2002/0184635 A1 | 12/2002 | Istvan |
| 2003/0004810 A1 | 1/2003 | Eldering |
| 2003/0005446 A1 | 1/2003 | Jaff et al. |
| 2003/0018977 A1* | 1/2003 | McKenna ........... H04N 5/44543 725/115 |
| 2003/0020744 A1 | 1/2003 | Ellis et al. |
| 2003/0030751 A1 | 2/2003 | Lupulescu et al. |
| 2003/0033199 A1 | 2/2003 | Coleman |
| 2003/0056217 A1 | 3/2003 | Brooks |
| 2003/0077067 A1 | 4/2003 | Wu et al. |
| 2003/0093311 A1 | 5/2003 | Knowlson |
| 2003/0093784 A1 | 5/2003 | Dimitrova et al. |
| 2003/0093790 A1 | 5/2003 | Logan et al. |
| 2003/0093792 A1 | 5/2003 | Labeeb et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0110503 A1 | 6/2003 | Perkes |
| 2003/0115601 A1 | 6/2003 | Palazzo et al. |
| 2003/0115612 A1 | 6/2003 | Mao et al. |
| 2003/0135513 A1 | 7/2003 | Quinn et al. |
| 2003/0140351 A1 | 7/2003 | Hoarty et al. |
| 2003/0145323 A1 | 7/2003 | Hendricks et al. |
| 2003/0149975 A1 | 8/2003 | Eldering et al. |
| 2003/0149990 A1 | 8/2003 | Anttila et al. |
| 2003/0149993 A1* | 8/2003 | Son ............... H04L 12/1836 725/132 |
| 2003/0172374 A1 | 9/2003 | Vinson et al. |
| 2003/0172376 A1 | 9/2003 | Coffin |
| 2003/0177495 A1* | 9/2003 | Needham ........... H04N 5/44543 725/55 |
| 2003/0198461 A1 | 10/2003 | Taylor et al. |
| 2003/0217365 A1 | 11/2003 | Caputo |
| 2003/0220100 A1 | 11/2003 | McElhatten et al. |
| 2003/0229681 A1 | 12/2003 | Levitan |
| 2003/0237090 A1* | 12/2003 | Boston ............... H04N 5/76 725/37 |
| 2004/0034873 A1 | 2/2004 | Zenoni |
| 2004/0047599 A1 | 3/2004 | Grzeczkowski |
| 2004/0060076 A1* | 3/2004 | Song ............... H04N 5/782 725/145 |
| 2004/0070678 A1 | 4/2004 | Toyama et al. |
| 2004/0073915 A1 | 4/2004 | Dureau |
| 2004/0078809 A1 | 4/2004 | Drazin |
| 2004/0103429 A1 | 5/2004 | Carlucci et al. |
| 2004/0109672 A1 | 6/2004 | Kim et al. |
| 2004/0117817 A1 | 6/2004 | Kwon et al. |
| 2004/0133467 A1 | 7/2004 | Siler |
| 2004/0138909 A1 | 7/2004 | Mayer |
| 2004/0148625 A1 | 7/2004 | Eldering et al. |
| 2004/0163109 A1 | 8/2004 | Kang et al. |
| 2004/0163111 A1 | 8/2004 | Palazzo et al. |
| 2004/0177383 A1 | 9/2004 | Martinolich et al. |
| 2004/0181811 A1 | 9/2004 | Rakib |
| 2004/0186774 A1 | 9/2004 | Lee |
| 2004/0194134 A1 | 9/2004 | Gunatilake et al. |
| 2004/0199789 A1 | 10/2004 | Shaw et al. |
| 2004/0230994 A1 | 11/2004 | Urdang et al. |
| 2005/0022237 A1 | 1/2005 | Nomura |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0039205 A1 | 2/2005 | Riedl |
| 2005/0047596 A1 | 3/2005 | Suzuki |
| 2005/0055685 A1 | 3/2005 | Maynard et al. |
| 2005/0060742 A1 | 3/2005 | Riedl et al. |
| 2005/0060745 A1 | 3/2005 | Riedl et al. |
| 2005/0086334 A1 | 4/2005 | Aaltonen et al. |
| 2005/0086691 A1 | 4/2005 | Dudkiewicz et al. |
| 2005/0105396 A1 | 5/2005 | Schybergson |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0138656 A1* | 6/2005 | Moore ............... H04N 7/165 725/45 |
| 2005/0144635 A1* | 6/2005 | Boortz ............... H04N 5/44543 725/32 |
| 2005/0160308 A1 | 7/2005 | Elcock et al. |
| 2005/0198686 A1 | 9/2005 | Krause et al. |
| 2005/0210502 A1 | 9/2005 | Flickinger et al. |
| 2005/0223409 A1 | 10/2005 | Rautila et al. |
| 2005/0229209 A1 | 10/2005 | Hildebolt et al. |
| 2005/0234998 A1 | 10/2005 | Lesandrini et al. |
| 2005/0235318 A1 | 10/2005 | Grauch et al. |
| 2005/0251827 A1 | 11/2005 | Ellis et al. |
| 2005/0262542 A1 | 11/2005 | Deweese et al. |
| 2005/0273819 A1 | 12/2005 | Knudson et al. |
| 2005/0276284 A1 | 12/2005 | Krause et al. |
| 2005/0289588 A1 | 12/2005 | Kinnear |
| 2005/0289618 A1 | 12/2005 | Hardin |
| 2006/0019702 A1 | 1/2006 | Anttila et al. |
| 2006/0031883 A1 | 2/2006 | Ellis et al. |
| 2006/0036750 A1 | 2/2006 | Ladd et al. |
| 2006/0037060 A1 | 2/2006 | Simms et al. |
| 2006/0080408 A1 | 4/2006 | Istvan et al. |
| 2006/0117341 A1 | 6/2006 | Park |
| 2006/0130113 A1 | 6/2006 | Carlucci et al. |
| 2006/0171390 A1 | 8/2006 | La |
| 2006/0171423 A1 | 8/2006 | Helms et al. |
| 2006/0190336 A1 | 8/2006 | Pisaris-Henderson et al. |
| 2006/0197828 A1 | 9/2006 | Zeng et al. |
| 2006/0218604 A1 | 9/2006 | Riedl et al. |
| 2006/0248555 A1 | 11/2006 | Eldering |

(56) References Cited

U.S. PATENT DOCUMENTS

| | | |
|---|---|---|
| 2006/0253328 A1 | 11/2006 | Kohli et al. |
| 2006/0253584 A1 | 11/2006 | Dixon et al. |
| 2006/0253864 A1 | 11/2006 | Easty |
| 2006/0259924 A1 | 11/2006 | Boortz et al. |
| 2006/0277569 A1 | 12/2006 | Smith |
| 2006/0288374 A1 | 12/2006 | Ferris et al. |
| 2006/0294259 A1 | 12/2006 | Matefi et al. |
| 2007/0022459 A1 | 1/2007 | Gaebel, Jr. et al. |
| 2007/0029379 A1 | 2/2007 | Peyer |
| 2007/0033531 A1 | 2/2007 | Marsh |
| 2007/0061023 A1 | 3/2007 | Hoffberg et al. |
| 2007/0074258 A1 | 3/2007 | Wood et al. |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0094692 A1 | 4/2007 | De Heer |
| 2007/0101370 A1 | 5/2007 | Calderwood |
| 2007/0113243 A1 | 5/2007 | Brey |
| 2007/0115389 A1 | 5/2007 | McCarthy et al. |
| 2007/0118852 A1 | 5/2007 | Calderwood |
| 2007/0150919 A1 | 6/2007 | Morishita |
| 2007/0157242 A1 | 7/2007 | Cordray et al. |
| 2007/0157262 A1 | 7/2007 | Ramaswamy et al. |
| 2007/0180230 A1 | 8/2007 | Cortez |
| 2007/0204310 A1 | 8/2007 | Hua et al. |
| 2007/0217436 A1 | 9/2007 | Markley et al. |
| 2007/0233857 A1 | 10/2007 | Cheng et al. |
| 2007/0239536 A1 | 10/2007 | Bollapragada |
| 2007/0244760 A1 | 10/2007 | Bodnar et al. |
| 2007/0276926 A1 | 11/2007 | Lajoie et al. |
| 2007/0280298 A1 | 12/2007 | Hearn et al. |
| 2008/0016526 A1 | 1/2008 | Asmussen |
| 2008/0022309 A1* | 1/2008 | Begeja .................. H04N 7/165 725/46 |
| 2008/0052157 A1 | 2/2008 | Kadambi et al. |
| 2008/0092181 A1 | 4/2008 | Britt |
| 2008/0115169 A1 | 5/2008 | Ellis et al. |
| 2008/0124056 A1 | 5/2008 | Concotelli |
| 2008/0147497 A1 | 6/2008 | Tischer |
| 2008/0155588 A1 | 6/2008 | Roberts et al. |
| 2008/0163305 A1 | 7/2008 | Johnson et al. |
| 2008/0170551 A1 | 7/2008 | Zaks |
| 2008/0192820 A1 | 8/2008 | Brooks et al. |
| 2008/0229354 A1 | 9/2008 | Morris et al. |
| 2008/0263578 A1 | 10/2008 | Bayer et al. |
| 2008/0271068 A1 | 10/2008 | Ou et al. |
| 2008/0271070 A1 | 10/2008 | Kanojia et al. |
| 2008/0273591 A1 | 11/2008 | Brooks et al. |
| 2008/0306903 A1 | 12/2008 | Larson et al. |
| 2008/0307454 A1 | 12/2008 | Ahanger et al. |
| 2008/0313671 A1* | 12/2008 | Batrouny .............. H04H 60/43 725/40 |
| 2008/0313691 A1 | 12/2008 | Cholas et al. |
| 2009/0030802 A1 | 1/2009 | Plotnick et al. |
| 2009/0086643 A1 | 4/2009 | Kotrla et al. |
| 2009/0132346 A1 | 5/2009 | Duggal et al. |
| 2009/0133048 A1 | 5/2009 | Gibbs et al. |
| 2009/0150917 A1 | 6/2009 | Huffman et al. |
| 2009/0187939 A1 | 7/2009 | Lajoie |
| 2009/0210899 A1 | 8/2009 | Lawrence-Apfelbaum et al. |
| 2009/0319379 A1 | 12/2009 | Joao |
| 2009/0320059 A1 | 12/2009 | Bolyukh |
| 2010/0005527 A1 | 1/2010 | Jeon |
| 2010/0027560 A1 | 2/2010 | Yang et al. |
| 2010/0057560 A1 | 3/2010 | Skudlark et al. |
| 2010/0107194 A1 | 4/2010 | McKissick et al. |
| 2010/0114696 A1 | 5/2010 | Yang |
| 2010/0115091 A1 | 5/2010 | Park et al. |
| 2010/0122276 A1 | 5/2010 | Chen |
| 2010/0125658 A1 | 5/2010 | Strasters |
| 2010/0161492 A1 | 6/2010 | Harvey et al. |
| 2010/0175084 A1 | 7/2010 | Ellis et al. |
| 2010/0175584 A1 | 7/2010 | Kusaka et al. |
| 2010/0218231 A1 | 8/2010 | Frink et al. |
| 2010/0251304 A1 | 9/2010 | Donoghue et al. |
| 2010/0251305 A1* | 9/2010 | Kimble .............. H04N 7/17318 725/46 |
| 2010/0262488 A1 | 10/2010 | Harrison et al. |
| 2010/0269131 A1 | 10/2010 | Newberry et al. |
| 2010/0275226 A1* | 10/2010 | Kitazato .............. H04N 7/17318 725/32 |
| 2010/0280641 A1 | 11/2010 | Harkness et al. |
| 2010/0293047 A1 | 11/2010 | Schwarz et al. |
| 2010/0313225 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0110515 A1 | 5/2011 | Tidwell et al. |
| 2011/0178880 A1 | 7/2011 | Karaoguz et al. |
| 2011/0178943 A1 | 7/2011 | Motahari et al. |
| 2011/0231265 A1 | 9/2011 | Brown et al. |
| 2011/0265116 A1 | 10/2011 | Stern et al. |
| 2011/0307339 A1 | 12/2011 | Russell et al. |
| 2011/0307920 A1* | 12/2011 | Blanchard .......... H04N 21/4431 725/32 |
| 2011/0317977 A1 | 12/2011 | Harris |
| 2012/0011269 A1 | 1/2012 | Krikorian et al. |
| 2012/0030363 A1 | 2/2012 | Conrad |
| 2012/0084813 A1 | 4/2012 | Dmitriev et al. |
| 2012/0110620 A1 | 5/2012 | Kilar et al. |
| 2012/0124161 A1 | 5/2012 | Tidwell et al. |
| 2012/0124606 A1 | 5/2012 | Tidwell et al. |
| 2012/0159539 A1 | 6/2012 | Berberet et al. |
| 2013/0041747 A1* | 2/2013 | Anderson .............. G06Q 10/10 705/14.39 |
| 2013/0114940 A1* | 5/2013 | Merzon .................. H04N 5/76 386/241 |
| 2013/0227608 A1 | 8/2013 | Evans et al. |
| 2014/0020017 A1 | 1/2014 | Stern et al. |

OTHER PUBLICATIONS

Tandberg Television specification entitled "AdPoint.RTM. Advanced Advertising Platform" dated Mar. 2008, 2 pages.

UTF-32, IBM, retrieved from http://publib.boulder.ibm.com/infocenter/iseries/v5r3/index.jsp?topic=%2Fnls%2Frbagsutf32.htm on Aug. 28, 2013.

* cited by examiner

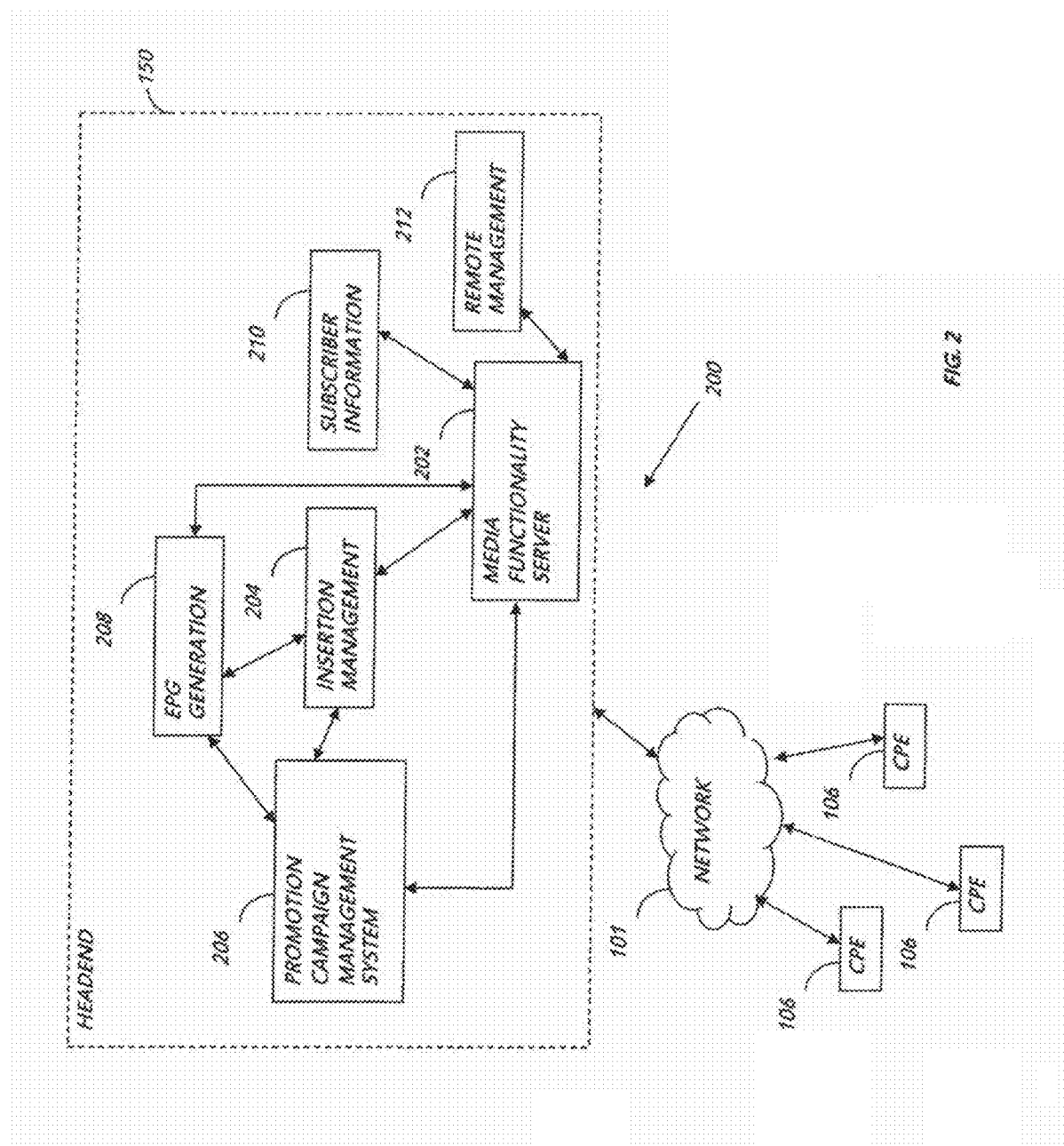

APPARATUS AND METHODS FOR ENABLING MEDIA OPTIONS IN A CONTENT DELIVERY NETWORK

PRIORITY AND RELATED APPLICATIONS

This application is a divisional of and claims priority to co-owned and U.S. patent application Ser. No. 14/789,671 filed on Jul. 1, 2015 of the same title and issuing as U.S. Pat. No. 9,621,939 on Apr. 11, 2017, which is a continuation of and claims priority to co-owned U.S. patent application Ser. No. 13/445,775 filed on Apr. 12, 2012 of the same title and issued as U.S. Pat. No. 9,078,040 on Jul. 7, 2015, each incorporated herein by reference in their entirety. In addition, the present application is related to co-owned U.S. patent application Ser. No. 10/948,271 filed on Sep. 22, 2004, entitled "SCHEDULING TRIGGER APPARATUS AND METHOD", and issued as U.S. Pat. No. 9,380,269 on Jun. 28, 2016, co-owned U.S. patent application Ser. No. 11/460,095 filed on Jul. 26, 2006, entitled "SCHEDULING TRIGGER APPARATUS AND METHOD", and issued as U.S. Pat. No. 9,060,100 on Jun. 16, 2015, co-owned U.S. patent application Ser. No. 12/503,749 filed on Jul. 15, 2009, entitled "METHODS AND APPARATUS FOR EVALUATING AN AUDIENCE IN A CONTENT-BASED NETWORK", and issued as U.S. Pat. No. 9,178,634 on Nov. 3, 2015, co-owned U.S. patent application Ser. No. 12/503,710 filed on Jul. 15, 2009, entitled "METHODS AND APPARATUS FOR TARGETED SECONDARY CONTENT INSERTION", and issued as U.S. Pat. No. 8,813,124 on Aug. 9, 2014, and co-owned U.S. patent application Ser. No. 12/503,772 filed on Jul. 15, 2009, entitled "METHODS AND APPARATUS FOR CLASSIFYING AN AUDIENCE IN A CONTENT DISTRIBUTION NETWORK", and issued as U.S. Pat. No. 8,935,721 on Jan. 13, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related in one exemplary aspect to apparatus and methods for enabling various options or functionalities for programming content.

2. Description of Related Technology

Recent advances in digital information processing and technology have made a range of services and functions available for delivery to consumers at their premises for very reasonable prices or subscription fees. Various methods of delivering media content such as video to end users or consumers are known. For example, when the consumer requests television services (such as from a cable, satellite, or terrestrial network service provider), the service provider generally installs a host or terminal device, such as a set-top box (STB), or a gateway configured to provide content to other devices in communication with the gateway (such as wireless or mobile devices). The terminal device provides access to the network media content at the consumer's premises. Additionally, content may be provided to other consumer devices via communication by the service provider with entities in other networks. The service provider (e.g., multiple systems operator or MSO) delivers the content over the various program channels subscribed by a particular user, as determined by a network or other content source, via the MSO network and STB or other network configurations as discussed above.

Accordingly, the foregoing services may be provided and delivered to the user via a wide variety of different equipment environments including, inter alia, cable modems, Wi-Fi™ or WiMAX hubs, Ethernet hubs, gateways, switches and routers, computers, servers, cable or satellite networks and associated set-top boxes, and PSTNs. These services are provided for a fee, such as a monthly subscription fee or per-usage fee.

The provided services and functions may include for example digital content or programming (movies, etc.), digital video-on-demand (VOD), personal video recorder (PVR) and networked PVR (nPVR), Internet Protocol television (IPTV), digital media playback and recording, as well high speed Internet access and IP-based telephony (e.g., VoIP). Other services available to network users include access to, and recording of, digital music (e.g., MP3 files), as well local area networking (including wire-line and wireless local area networks) for distributing these services throughout the user's premises, and beyond. Network-delivered or network-based gaming and applications ("apps") have also each recently come to the forefront as popular content areas for subscribers.

In order to increase subscriber awareness (and viewership) of the delivered content, networks deliver so-called "promotions" for these events. A promotion might comprise, e.g., a short clip or compilation of scenes from a promoted event, which is constructed so as to pique viewer interest. Promotions are interspersed within a particular channel's other programming (such as during breaks between programs). A promotion may be linked to the channel on which it is displayed, or may be unrelated to any particular channel or group of channels (such as e.g., VOD or PPV content). Promotions may be disposed within the programming schedule so as to occur at predetermined times where their efficacy is considered greatest. For example, a promotion might comprise a brief video trailer with associated audio content of a movie which has the same actors, or similar theme/genre, to that currently viewed by the subscriber.

Alternatively, promotions may comprise small animated or static graphics (and sometimes associated audio) disposed in a visible but largely non-intrusive region of the viewer's display, which briefly promote a given event or series of events. As a simple example, a small iconic basketball may briefly dribble across the lower portion of the viewer's display region, followed by the words "NBA Finals on XYZ TV July 25 at 8:00 pm EST" or the like. Further, static graphic or animated promotions may be displayed in a non-intrusive portion of an electronic program guide (EPG).

Promotions generally alert a viewer as to the substance of the promoted event, and the date and time that the event would be aired or otherwise be made accessible. However, prior art technologies require the viewer to not only remember the information given in the promotion, but also proceed through a series of complex steps in order to e.g., schedule a viewing of the promoted event, receive a reminder of the promoted event, and/or immediately view the promoted event. For example, the viewer must program his/her recording device to record the promoted event at the specified date and time, and then after the specified date and time, cause the device to play the recording. A viewer viewing the promotion in an EPG will similarly have to access a listing for the appropriate channel, locate the promoted event in the listing, and set the system to play, record or remind the viewer of the event when it occurs.

In addition to the complexity and extra effort required to effectuate such activities, there is often a significant decline in a given user's motivation to watch or record the event. That is to say, if the promoted event is something that the prospective viewer is only marginally interested in, they may be dissuaded from viewing or recording the event, as doing so requires too much effort. Further, even the more motivated viewer may simply forget to program their recording device or tuner/receiver, such as where they get distracted by another subsequent promotion. Still further, it is well known that a viewer's motivation to view particular programming may wane as a function of time lapsed after the promotion, thereby making them less likely to view or record the event as time goes on.

Additionally, with the vast number of channels now available, it is often difficult for the viewer to remember on which network a given show is appearing, and/or the date and time for a particular event. Moreover, some shows or events now air on multiple networks at different days/times, making this proposition even more difficult.

In light of the foregoing, an improved apparatus and method for scheduling various activities (such as tuning, viewing, and/or recording) relating to delivered content is needed. Such improved apparatus and methods would ideally both (i) relieve the viewer from having to take burdensome additional actions (such as programming their DVR or EPG) to schedule these activities, and (ii) allow for contemporaneous scheduling of these activities with promotional events, when viewer motivation and opportunity is piqued.

SUMMARY OF THE INVENTION

The present invention addresses the foregoing needs by disclosing, inter alia, apparatus and methods for enabling various options or functionalities for programming content.

In a first aspect of the invention, a method for providing media functionality to a plurality of devices in communication with a content delivery network is disclosed. In one embodiment, the method includes determining one or more media functionality options for delivery to a user as respective one or more embedded triggers within a promotion. In one variant, the one or more media functionality options comprise options to be taken with respect to a promoted event. A promotion is delivered to the user, the promotion comprising at least the one or more embedded triggers. A selection of a first one of the one or more media functionality options from the user is received via selection of a respective first one of the one or more embedded triggers, and based at least in part on the user selection, a determination is made; e.g., whether to: implement the selected first one of the one or more media functionality options, or deliver a message indicating a previous selection of the first one of the one or more media functionality options, and deliver to the user one or more second media functionality options.

In a second aspect of the invention, a server apparatus configured to provide a plurality of media functions to one or more client devices is disclosed. In one embodiment, the apparatus includes at least one first interface for communication with the one or more client devices, a storage device, and a processor configured to run at least one computer program thereon. In one variant, the computer program comprises a plurality of instructions configured to, when executed: (i) receive a plurality of parameters relating to a secondary content, (ii) utilize the parameters to insert one or more media function-enabling triggers into a media stream comprising the secondary content, and (iii) provide the secondary content to the one or more client devices in communication therewith via the at least one first interface.

In a third aspect of the invention, a method for enabling one or more media functions with respect to a promoted event is disclosed. In one embodiment, the method comprises: (i) enabling an operator of a content delivery network to configure one or more parameters with respect to a plurality of media functions, (ii) gathering a plurality of information regarding one or more devices associated with an individual user in the network, (iii) using at least the information regarding the one or more devices and the one or more parameters to identify individual ones of a plurality of media functions which are available for display to the individual user, and (iv) providing the individual user an ability to implement the identified individual ones of the plurality of media functions with respect to the promoted event at one or more of the one or more devices via a selection thereof by the individual user.

In a fourth aspect of the invention, a non-transitory computer readable apparatus comprising a plurality of instructions is disclosed. In one embodiment, the plurality of instructions are configured to, when executed by a processor: receive a plurality of parameters relating to a promotion campaign, utilize at least (i) at least the parameters, (ii) information regarding a plurality of user devices, (iii) a current time, and (iv) information regarding a channel line-up, to identify and insert one or more media function-enabling triggers into a media stream for delivering the promotion campaign. The media stream is provided to the one or more client devices in communication therewith via the at least one first interface.

In a fifth aspect of the invention, a consumer premises device is disclosed. In one embodiment, the consumer premises device is configured to provide information relating to a hardware and/or software configuration thereof to a headend entity, receive a plurality media options, and enable a user of the device to select from among the plurality of media options.

In a sixth aspect of the invention, a headed management entity configured to enable a network operator to select parameters of an advertising campaign comprising a plurality of media options is disclosed. In one embodiment, the headend management entity includes at least one first graphic user interface for displaying information to and receiving commands from the network operator, a storage device, and a processor configured to run at least one computer program thereon. In one variant, the computer program comprises a plurality of instructions configured to, when executed: (i) display a plurality of parameters relating to the media options of a particular secondary content within the advertising campaign, (ii) receive a selection of one or more of the parameters from the network operator, (iii) utilize the selection of the one or more of the parameters to generate a metadata file, and (iii) provide the metadata file to one or more servers configured to insert one or more media option-enabling triggers into a media stream comprising the secondary content.

In a seventh aspect of the invention, a system for implementing media function options within a content distribution network is disclosed.

In an eighth aspect of the invention, a method for utilizing embedded triggers within delivered content is disclosed.

These and other aspects of the invention shall become apparent when considered in light of the disclosure provided herein.

BRIEF DESCRIPTION OF THE DRAWINGS

FIG. 2 is a functional block diagram illustrating an exemplary network architecture configured for use in the present invention.

FIG. 2c is an illustration of an exemplary embodiment of a user interface for enabling configuration of various parameters of a promotion campaign.

Figure 1:
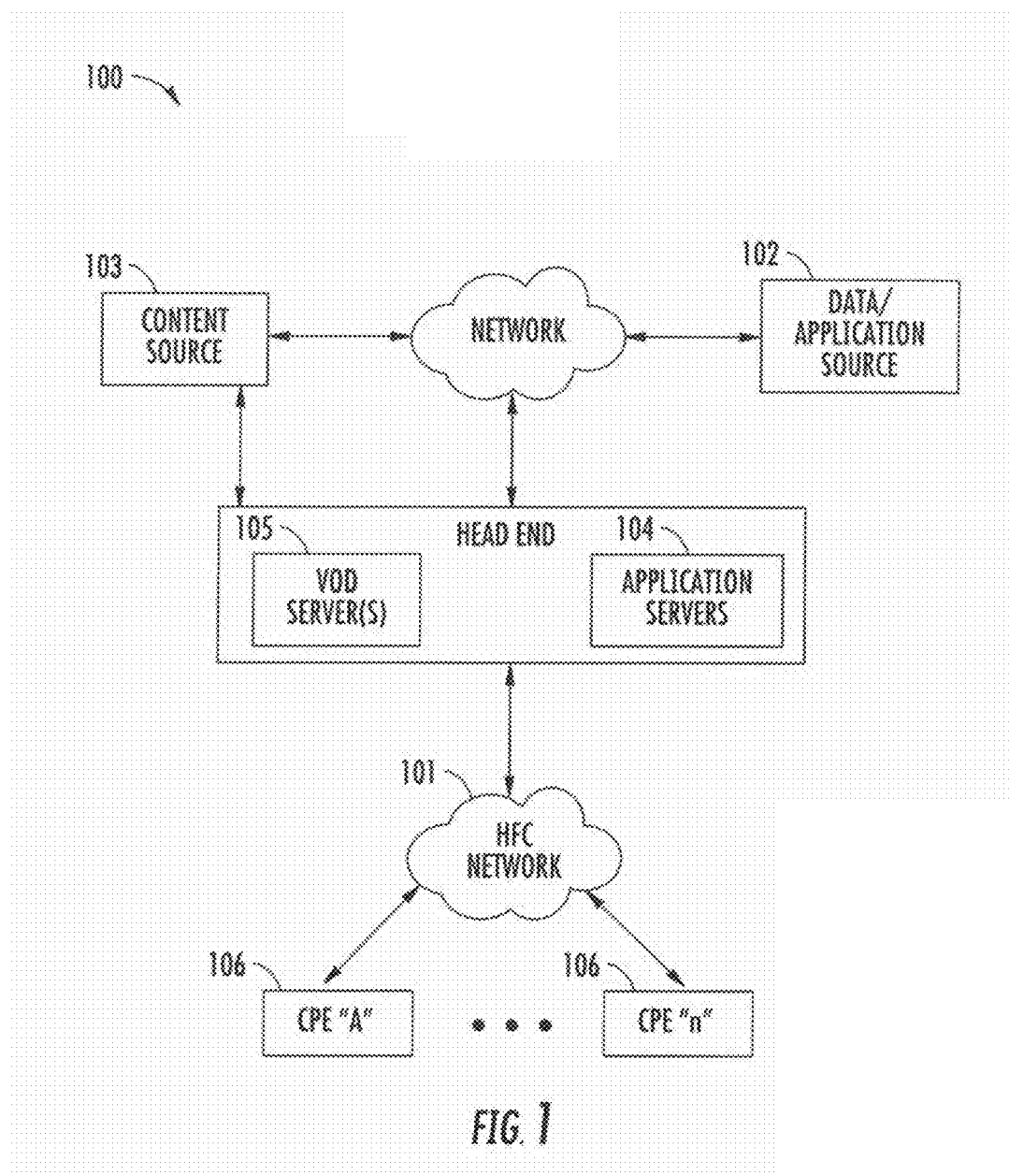
FIG. 1 is a functional block diagram illustrating an exemplary hybrid fiber network configuration useful with the present invention.

All Figures and Appendices ©Copyright 2012 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (Real Video, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The term "Customer Premises Equipment (CPE)" refers to any type of electronic equipment located within a customer's or user's premises and connected to a network, such as set-top boxes (e.g., DSTBs or IP TV devices), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the terms "Internet" and "internet" are used interchangeably to refer to inter-networks including, without limitation, the Internet.

As used herein, the term "memory" or "storage" includes any type of integrated circuit or other storage device adapted for storing digital data including, without limitation, ROM.

PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), Wi-MAX (802.16), PAN (802.15), cellular (e.g., LTE/LTE-A, 3GPP, 3GPP2, UMTS), or IrDA families.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n.

Overview

In one salient aspect, the present invention comprises apparatus and methods for providing media functionality or options. In one exemplary embodiment, the media functionality/options are presented in conjunction with a promotion or advertisement for particular content. For example, the apparatus of the invention may embed or associate one or more triggers within the promotional broadcast or content distribution.

A determination of the precise ones of a plurality of disclosed options that will be presented is based in one implementation on (i) a campaign established by a content management entity, and (ii) a current availability of the content. For example, certain media functionality options may only be made available to content that is currently available, other options may be only available to content that will be available at a future date/time, certain options may only be made available during a particular time window, and so forth. A media functionality server at the network head-end is configured to make decisions regarding which media functionality or options to provide within a given promotion, and to enable and process user selections thereof. Additionally, an insertion management entity, a promotion campaign management entity, and an EPG generation system also provide information useful in the decision-making process of the media functionality server. Decisions may be further based on user (i.e., the network operator or promotion manager) input via a user interface in communication with one or more of the foregoing entities.

The various media functionality options include e.g., (i) causing the device which selected the option to tune to the promoted event immediately, (ii) enabling the device which selected the option to cause one or more additional devices to tune to the promoted event immediately, (iv) causing the device which selected the option to tune to the promoted event at some date/time in the future, (iv) enabling the device which selected the option to additionally cause one or more other devices to tune to the promoted event at some date/time in the future, (v) causing a reminder regarding a promoted event to be sent to the device which selected the option, (vi) enabling the device which selected the option to identify one or more additional devices to receive reminders regarding a promoted event, (vii) causing a recording device associated with the device which selected the option to record content, and (viii) based on the selected option on one device, cause one or more recording devices associated with one or more respective other devices to additionally record content. It is further appreciated that the programming content may in one embodiment comprise episodic or recurring content. Hence, the aforementioned media functionality options may further comprise options for force tuning, recording and/or reminding at each instance of recurrence of the programming content. It is appreciated that the force tune event as discussed herein may comprise tuning to currently broadcast or immediately available content, and/or storing a signal to cause one or more devices to tune to the event at the date/time (in the future) it becomes available for viewing. Methods for enabling various ones of these media functionality options are discussed herein.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable system architecture having a multiple systems operator, digital networking capability, and plurality of client devices/CPE, the general principles and advantages of the invention may be extended to other types of networks and architectures, whether broadband, narrowband, wired or wireless, terrestrial or satellite, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Bearer Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
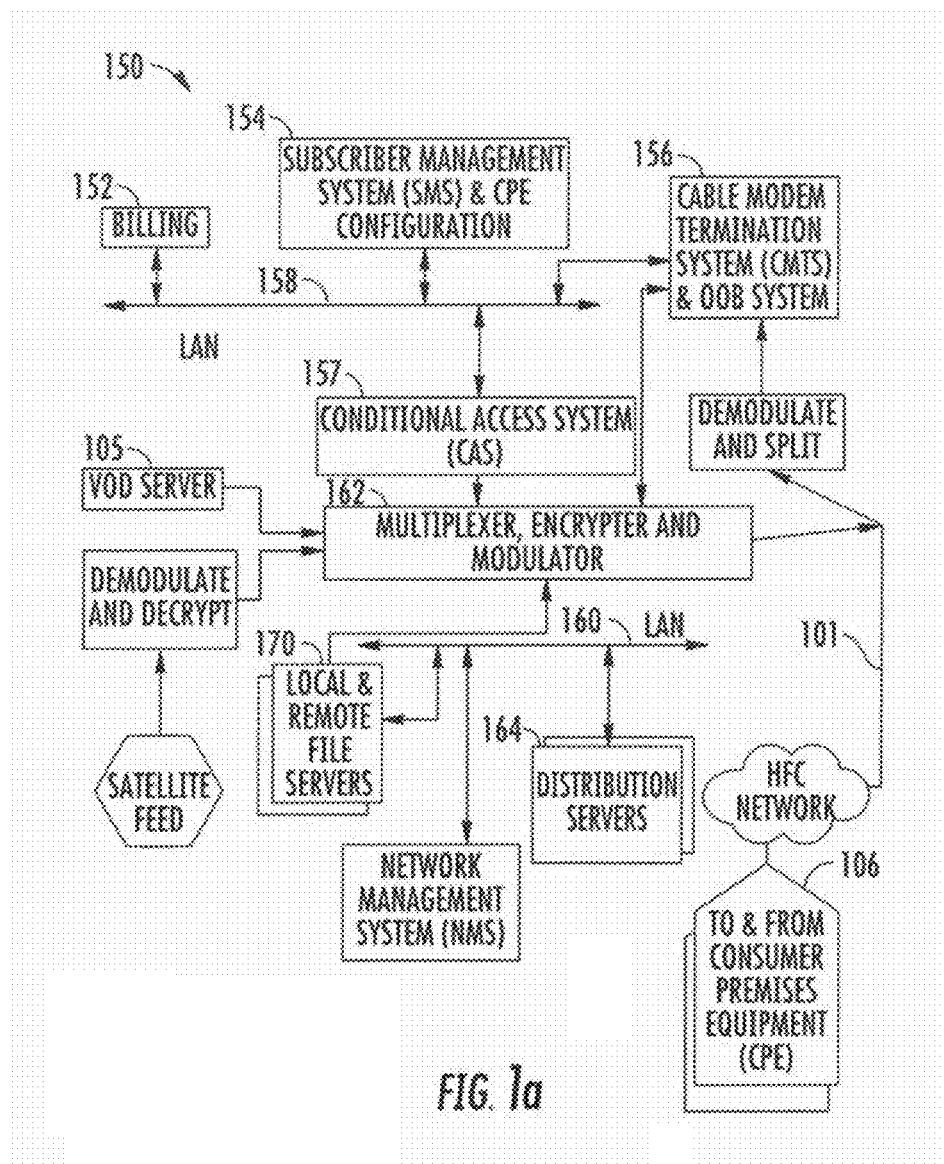
FIG. 1a is a functional block diagram illustrating one exemplary network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
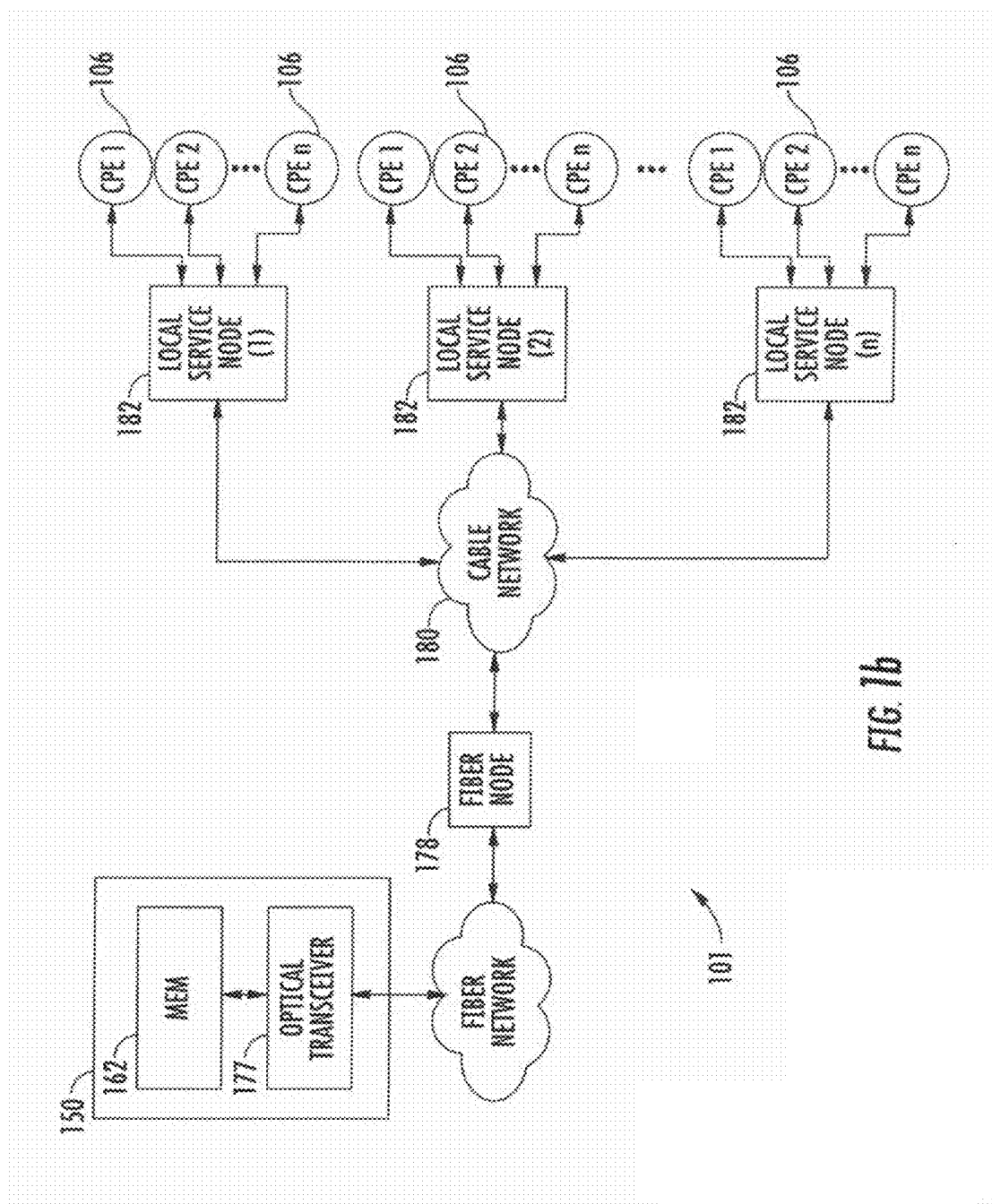
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

Figure 1C:
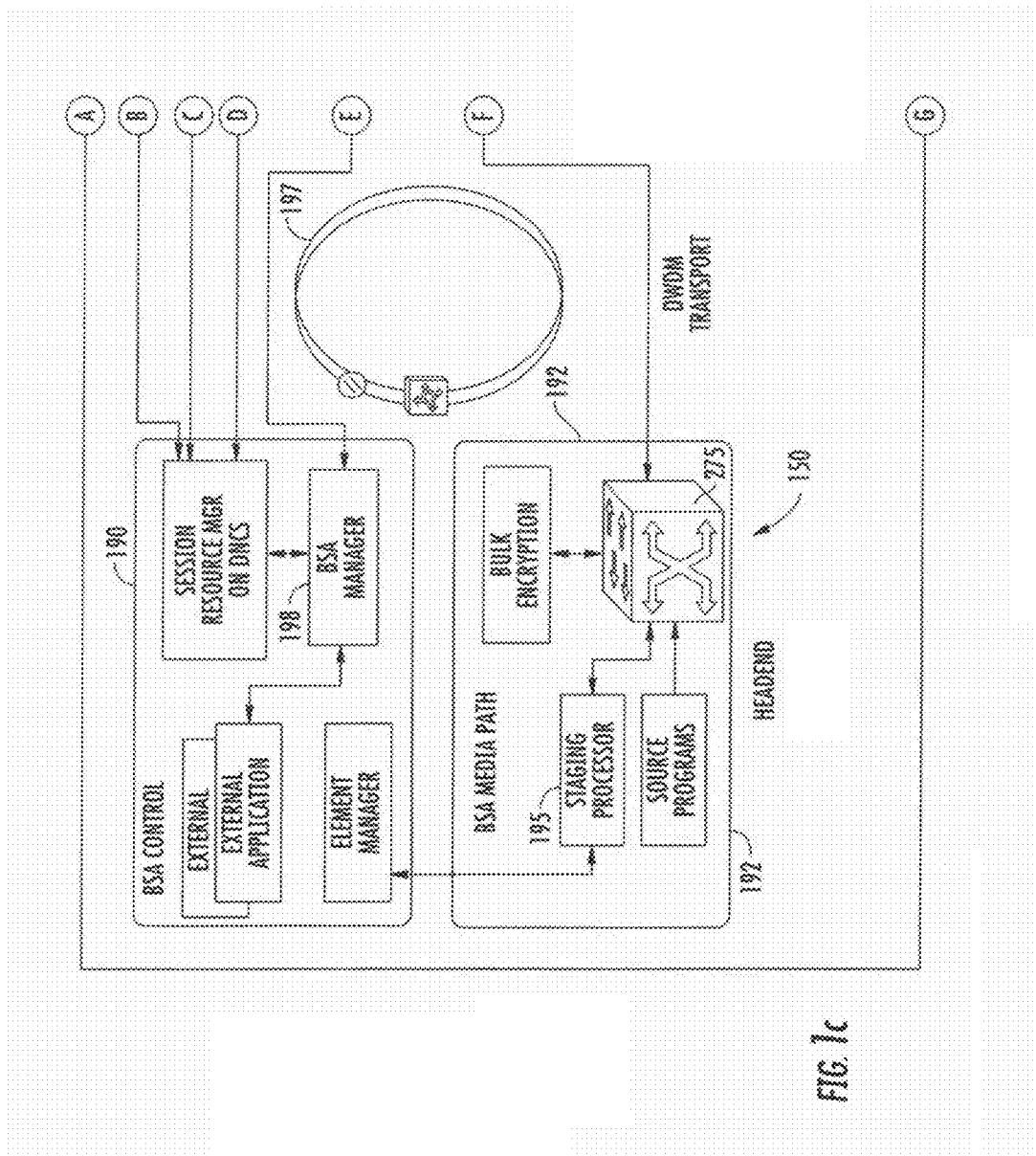
FIG. 1c is a functional block diagram illustrating one exemplary broadcast switched architecture (BSA) network useful with the present invention.
Figure 1C:
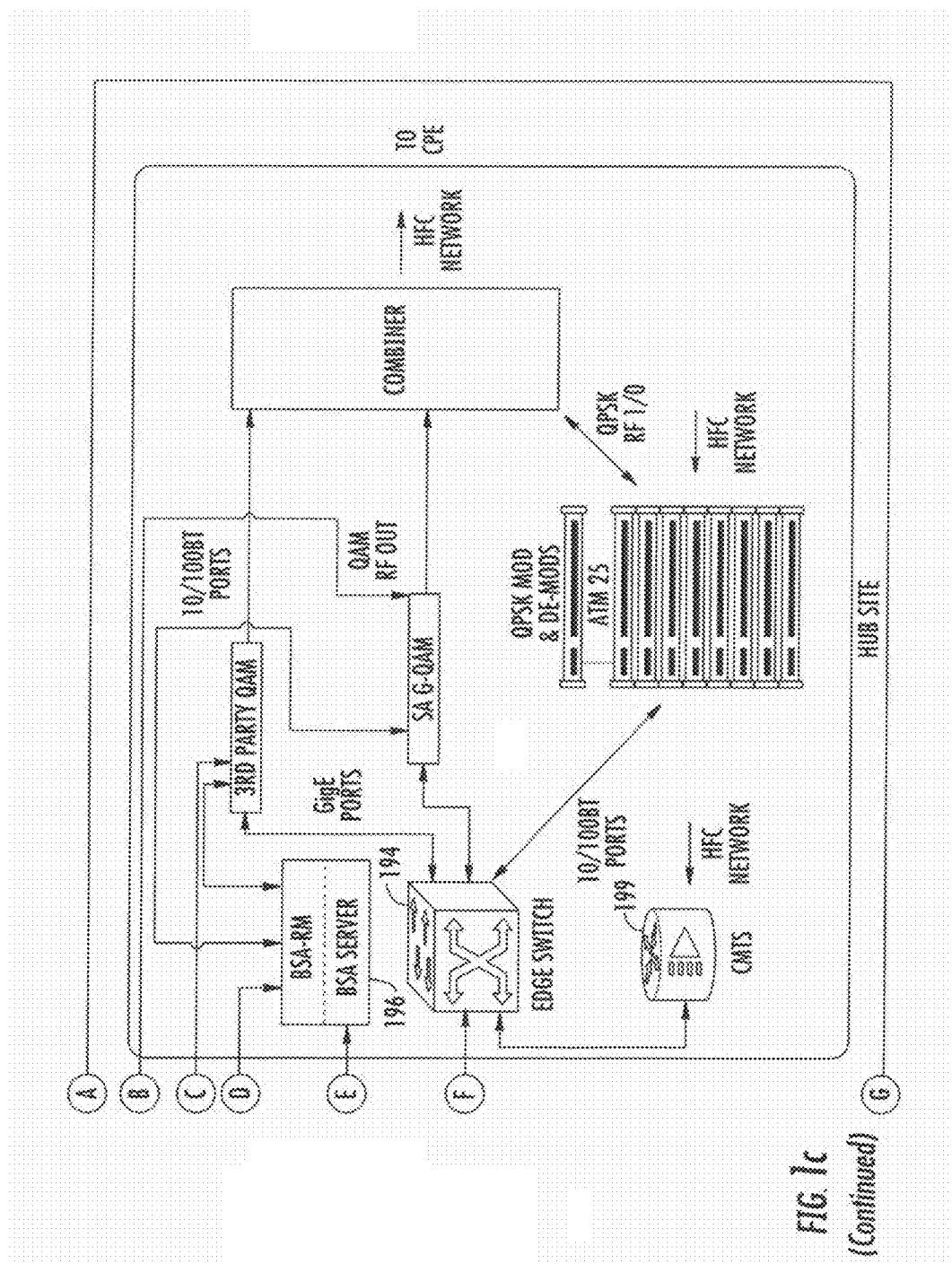

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

"Switched" Networks—

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. Patent Application Publication No. 2003/0056217 filed Sep. 20, 2001, entitled "TECHNIQUE FOR EFFECTIVELY PROVIDING PROGRAM MATERIAL IN A CABLE TELEVISION SYSTEM", and issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1c, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
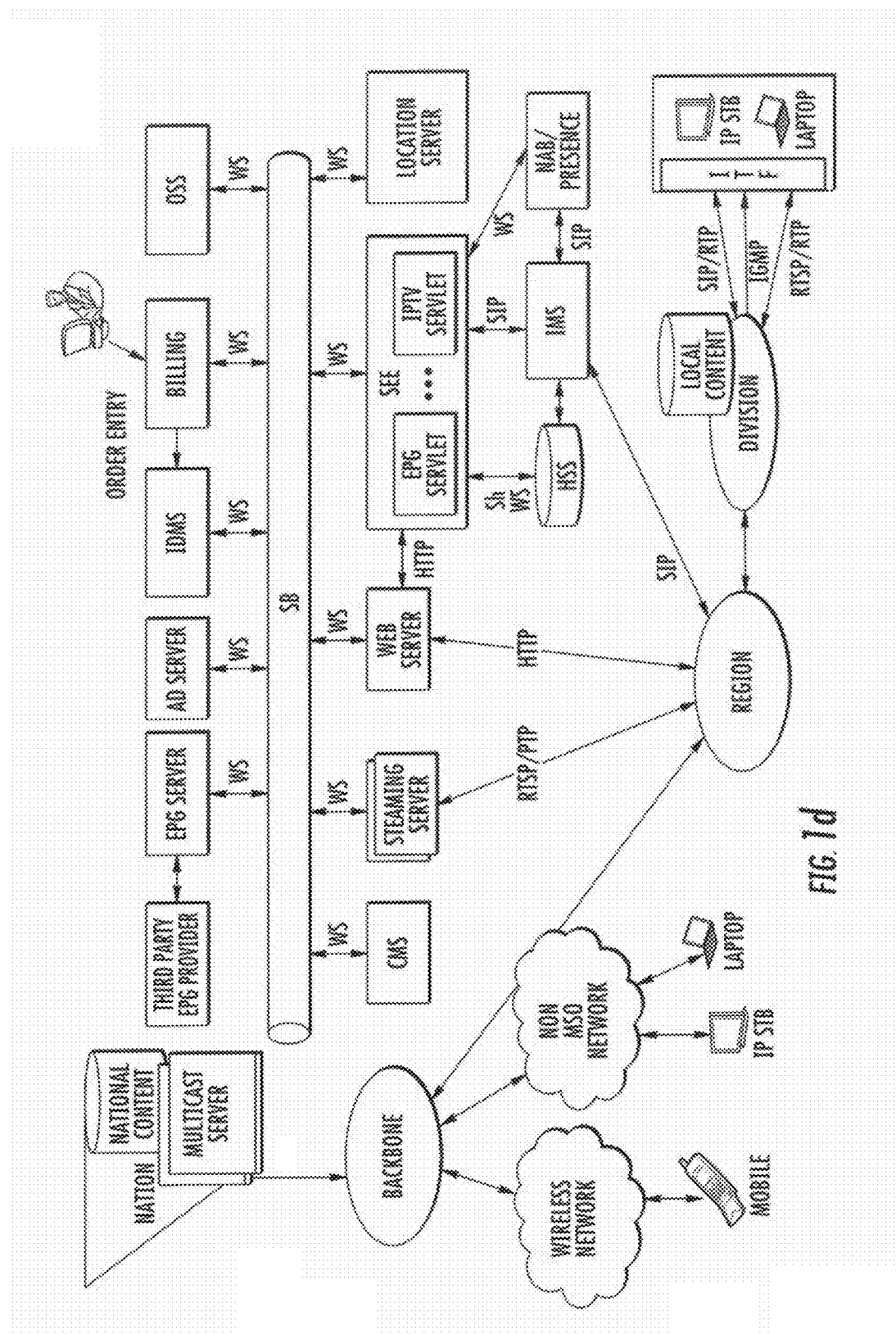
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides significant enhancements in terms of common control of different services, implementation and management of content delivery sessions according to unicast or multicast models, etc.; however, it is appreciated that the various features of the present invention are in no way limited to any of the foregoing architectures.

Media Option Network Architecture—

FIG. 2 is a block diagram illustrating a content delivery network architecture 200 for enabling media functionality options configured in accordance with one embodiment of the invention. As illustrated, promotions are provided to a plurality of user CPE 106. The promoted content is in one embodiment configured to contain various embedded triggers which are selectable by the users. The triggers, when selected, enable various media functionality options as will be discussed herein.

In one embodiment, the aforementioned embedded trigger comprises those disclosed according to the apparatus and methods discussed in previously incorporated co-owned U.S. patent application Ser. No. 10/948,271 filed on Sep. 22, 2004, entitled "SCHEDULING TRIGGER APPARATUS AND METHOD", and issued as U.S. Pat. No. 9,380,269 on Jun. 28, 2016, and co-owned U.S. patent application Ser. No. 11/460,095 filed on Jul. 26, 2006, entitled "SCHEDULING TRIGGER APPARATUS AND METHOD", and issued as U.S. Pat. No. 9,060,100 on Jun. 16, 2015. As discussed therein, a scheduling "trigger" or other artifact is associated with a promotion of an event to be broadcast or made available in the future. This trigger or artifact invokes a desired response, such as tuning to a prescribed channel or causing recording to start, causing a recording to be scheduled, sending a reminder, etc. within the viewer's receiver or CPE (e.g., DSTB) coincident with or related to the promoted event.

Advantageously, the present invention allows the user to readily schedule an event for viewing, recording, etc. without having to program recorders or navigate difficult-to-use menu structures or program guides. The embedded or associated triggers (E/ATs) within the promotion allow the viewer to control their viewing or recording of the promoted event without having to take further actions. This approach also allows the viewer to schedule viewing of the event when their interest is highest; i.e., at the time of the promotion. The more work that the viewer must perform to view the promoted event, the less likely they are to view or record the event. Similarly, the greater the elapsed time between the promoted event and the event itself, the less likely the viewer is to remember the date and time of the event. Hence, the embedded triggers provide a solution which is both extremely simple to use, and which allows effectively instantaneous scheduling or commitment of the user to watch the promoted event.

The use of embedded triggers as discussed herein may be facilitated via a download of an embedded/associated trigger application to (or other installation of software modifications of) client devices, and using existing infrastructure and no hardware changes.

In one embodiment, the apparatus of the invention embeds or associates one or more scheduling triggers within the promotional broadcast or content distribution. The trigger, when delivered and made cognizable to the end user, may be in any form including e.g., a visual form, audible form, tactical form, or a combination thereof. For example, the trigger user interface (UI) may comprise an icon or menu that is visually displayed during or coincident with the promotional broadcast or use of the distributed content. In one variant, the menu comprises a user-navigable visual menu disposed along, e.g., one edge of the viewers screen when the viewer is tuned to the promotional broadcast. The embedded/associated trigger functionality can also be made user-configurable, such as where the user can customize the operation of the trigger for their preferences. In another variant, an audible prompt or promotion is played (e.g., a short audio clip describing the event and time, as well as instructions for selecting this event, or scheduling a reminder, tuning directly to the event, and/or setting a recording).

In yet another implementation, the promotion comprises an electronic mail or other message, such as one containing a "Flash" multimedia module, that is sent to the CPE or another client device (such as a PC, laptop, smart phone, or handheld computer) that utilizes the local application environment to present the promotional material to the user. A client portion of the embedded/associated trigger and scheduling application (as described below) can also be used to provide cross-platform functionality, such as between a mobile wireless device and the user's CPE.

Referring again to FIG. 2, a media functionality server 202 at the network headend 150 is configured to make decisions regarding which media functionality or options to provide within a given promotion, and to enable and process user selections. In one embodiment, the network 101 comprises a managed (e.g., MSO-controlled) content and data delivery network, such as e.g., a content distribution network of the type discussed above with respect to FIGS. 1-1d herein.

The media functionality server 202 is in communication with a subscriber information server 210, a remote digital video recorder (DVR) management entity 212, and various entities for promotion management including e.g., an insertion management entity 204, an electronic program guide (EPG) generation entity 208, and a promotion campaign management entity 206.

The subscriber information server (SIS) 210 receives subscriber requests either directly from the CPE 106 via the network 101, or indirectly from the media functionality server 202 or other intermediary entity. The SIS 210 stores a plurality of records comprising information regarding individual ones of a plurality of premises (e.g., subscriber households). The records may include e.g., information describing a number of service addresses on an account, information describing the number and capabilities of the devices registered to an account (such as e.g., DVR capabilities, etc.), etc. When a request is received, the SIS 210 uses information within the request to identify a premises record associated to the requesting device; this information is provided to the media functionality server 202 for use in making decisions regarding which media functionality/options to provide.

Records regarding removal or addition of new CPE 106 to a home network (or otherwise associated to a subscriber account or registered to a subscriber account) are generated and stored at the SIS 210.

The remote management entity 212 communicates with the media functionality server 202. In the instance that a user selects the media functionality or option of recording a program, the remote management entity 212 is provided this information (such as from the media functionality server 202) and provides one or more commands either directly to the user device 106 or to the server 202 for delivery to the device 106. The commands sent cause a DVR associated to the CPE 106 to automatically record a particular content. In one embodiment, a promotion may comprise an advertisement (such as a short clip or trailer) for a movie that will broadcast on a particular channel at some future date/time. The server 202 may decide to place one or more embedded triggers within the promotion for recording the promoted movie. If the user is interested in recording the program, the user may select the embedded trigger (via a user interface displayed on a display associated with the user's CPE 106). A signal indicating a selection of the embedded trigger by the user is passed via the interposed network infrastructure to the remote management entity 212, which then creates a command signal. The command signal in one implementation includes metadata (e.g., rendered in XML, HTML, RDF, XMP, etc.) derived from the promotion, from the signal indicating the user's selection, or received separately therefrom, such as from the media functionality server 202. In one embodiment, the command signal is provided directly to the CPE 106 from the remote management entity 212. Alternatively, the command signal may be provided indirectly thereto, such as via one or more intermediary servers or processes.

The remote management entity 212 may also be used to schedule reminders and send command signals which cause one or more reminder messages to be displayed on the CPE 106. In one embodiment, a promotion may comprise, in addition to the advertisement itself, an embedded trigger placed therein by the media functionality server 202 for reminding the user about the promoted event. The user may then select the embedded trigger via a GUI on the CPE 106 display device to schedule reminders. Selection of the reminder trigger is indicated to the remote management entity 212 (directly or via the media functionality server 202). The remote management entity 212 generates a command signal which indicates to the CPE 106 receiving the signal that a reminder should be displayed. The management entity 212 uses metadata within the promotion, within the user selection signal, or received from another entity (such as the media functionality server 202) to generate the reminder. The selection of the embedded remind trigger may, for a single promoted event, initiate one or more reminders.

As will be discussed below with respect to the insertion management entity 204, a control entity may establish a number, frequency, time window, etc. for sending reminders. In one variant, the one or more command signals indicating that a reminder is to be displayed are stored at the remote management entity 212, and distributed according to a predetermined schedule established by a network operator (such as via the insertion management entity 204). Alternatively, the one or more command signals may be provided upon generation thereof to the CPE 106, which then stores each.

At a date/time provided in the command, the reminder message is displayed. The content of the message itself may be received from the media functionality server 202 either at the time of generation of the commands at the remote management entity 212, or pulled therefrom at the date/time indicated in the command. Alternatively, other existing CPE reminder capabilities may be leveraged for message generation and delivery.

In another variant, the record commands and/or the reminder commands are broadcast to multiple users. In other words, the media functionality server 202 and/or the remote management entity 212 maintains a list or other record of the individual ones of the plurality of CPE 106 which selected the record or remind command. For example, if a group of users has selected a trigger to record a future event, the remote management entity 212 and/or server 202 may generate a single command signal configured to cause the recording. The single signal is then provided via the network 101 to those devices which so requested. It is appreciated that the number of command signals may vary based on the various CPE 106 configurations and other factors, such as the nearness in time in which several requests (trigger selection signals) are received.

The insertion management entity 204, the promotion campaign management entity 206, and the EPG generation system 208 also provide information useful in the decision-making process of the media functionality server 202.

The insertion management entity 204 provides mechanisms for a controlling entity (such as a network operator or promotion manager, which may be a third party and disposed remotely from the network operator) to establish the details with respect to the media functionality options to be provided in a given promotion or promotion campaign. The insertion management entity 204 is configured to, in one embodiment, insert the embedded triggers associated with each media functionality or option into a content stream. Additionally, the insertion management entity provides an interface for enabling the network operator or promotion manager to manage various functions and settings of a particular promotion campaign. The insertion management entity 204 communicates with the promotion campaign management entity 206 to enable the user to manage the promotion campaign.

The promotion campaign management entity 206 comprises one or more processes (e.g., algorithms rendered as applications or computer programs) for establishing a promotion campaign, making changes to an existing campaign, and establishing and changing parameters of individual ones of media functionality options provided within the campaign. An interface for enabling a user (i.e., the network operator or promotion manager) to interact with the process of the promotion campaign management entity 206 may be run from either the promotion campaign management entity 206 itself, or another entity of the headend 150 (such as e.g., the insertion management entity 204 and/or the media functionality server 202), or a non-MSO entity such as a remote server.

Information from a broadcast schedule is used in developing a promotion campaign. For example, the network operator or promotion manager may elect to display certain promotions during a broadcast presentation of other content similar in context, genre, actors, relevance, demographics/psychographics, etc. to the content promoted. To do this, the operator/manager in one implementation uses channel line-up or broadcast schedule information from an EPG generator 208.

The functionalities of the described entities of the network architecture 200 of FIG. 2 may not necessarily be assigned as discussed. Rather, other embodiments (such as those where one or more devices—including those not discussed in the embodiment of FIG. 2—share a given function) may be utilized consistent with the invention. The network embodiment of FIG. 2a, for example, illustrates an exemplary network having certain ones of the aforementioned functionality distributed across multiple (extant and additional) headend entities.

Figure 2A:
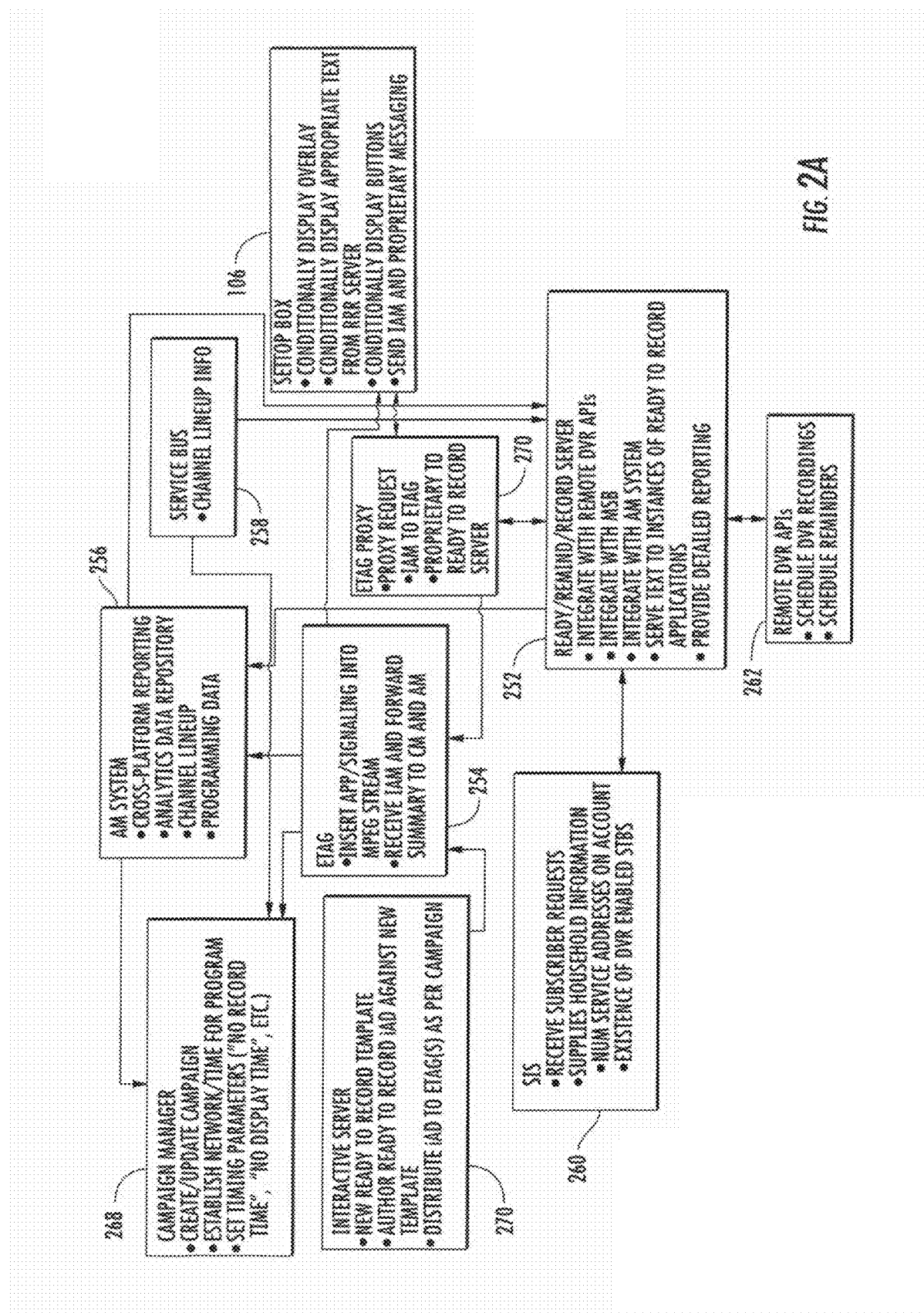
FIG. 2a is a functional block diagram illustrating a second exemplary network architecture configured for use in the present invention.

As shown in FIG. 2a, the network 250 generally comprises a so-called "ready/remind/record" (RRR) server 252 figured to integrate with various entities for enabling media functionality options similar to the media functionality server discussed above.

In one exemplary implementation, the RRR server 252 is configured to provide reminders to various CPE 106 in the network, and/or enable content recording to be scheduled thereat via the RRR server 252 integrated to one or more remote DVR APIs 262. The remote DVR APIs enable recordings and reminders to be scheduled remotely from the network to the CPE 106 in communication therewith. In one embodiment, as discussed above, such reminders and recording functions are enabled via control messages which are generated at, e.g., the RRR server 252 and distributed using the remote APIs 262.

The RRR server 252 is further configured to utilize information received from a subscriber information system (SIS) 260 and channel information service bus 258 to provide detailed reporting within the system and to ensure that conditions set forth by the campaign manager 268 are met when embedded triggers are inserted into promotions (as discussed below). In addition, message text may be stored at the RRR server 252 and provided to an ETAG entity 254 for insertion into a promotion as an embedded trigger (also discussed below).

Advertisements or promotions are in the illustrated configuration managed via the Audience Measurement (AM) system 256, and the campaign manager 268. The AM system 256 provides, inter alia, cross-platform reporting, an analytics data repository, channel lineup information, and programming data, which may be pulled/pushed from other headend entities and provided to other entities of the system. In one example, information from the AM system 256 is provided to the RRR server 252 (for integration therewith).

Additionally, information generated at the AM system 256 may be provided to a campaign manager 268. The campaign manager 268 is used to create and update advertisement campaigns including by establishing times, dates, running length, parameters preferences, etc. for a particular promotion or set of promotions (referred to as a "campaign"). The campaign manager may use information received from a service bus 258 or other entity containing information relating to a channel lineup. In one embodiment, the campaign manager 268 comprises e.g., the AdPoint® campaign manager 268 as discussed in the Tandberg Television specification entitled "AdPoint® Advanced Advertising Platform" dated March 2008", which is incorporated herein by reference in its entirety.

In another variant, the campaign manager and promotion management services discussed in co-owned U.S. patent application Ser. No. 12/503,749 filed on Jul. 15, 2009, entitled "METHODS AND APPARATUS FOR EVALUATING AN AUDIENCE IN A CONTENT-BASED NETWORK", and issued as U.S. Pat. No. 9,178,634 on Nov. 3, 2015, and co-owned U.S. patent application Ser. No. 12/503,772 filed on Jul. 15, 2009, entitled "METHODS AND APPARATUS FOR CLASSIFYING AN AUDIENCE IN A CONTENT DISTRIBUTION NETWORK", and issued as U.S. Pat. No. 8,935,721 on Jan. 13, 2015, previously incorporated herein by reference, is used in conjunction with the present invention. As discussed therein, the aforementioned apparatus and methods may be used for identifying, creating and distributing audience or viewer qualities to an advertisement management system and/or an advertisement decision maker. The data is provided in real time (or near real time) thereby enabling audience monitoring for all content, including inter alia, broadcast, VOD, and DVR content.

In this manner, more targeted advertising campaigns are created through use of an algorithm that combines advertising placement opportunities with audience qualifiers (i.e., psychographic, geographic, demographic, characteristic, etc. classifications) to create an advertising "inventory" that can be more readily monetized.

In different variants, the inventory can be based on historical and/or "real time" data, such that adverting placements can be conducted dynamically based on prevailing audience characteristics or constituency at that time. The advertisement management system then, in one such implementation, uses the gathered audience information to correlate particular advertisements or other content thereto. In one variant, an algorithm is used to analyze audience qualifiers (i.e., attributes of an audience or its behavior), and determine the "proximity" of a given audience (e.g., that currently viewing a program, where an impending placement opportunity will occur) to a set of audience qualifiers of a target audience of an advertisement or promotion. The placement opportunity can then be optimized for one or more variables (e.g., proximity, revenue, impressions, etc.) by selecting the best fitting advertisement for that opportunity, such as by evaluation of one or more correlating or statistical parameters indicative of the quality of "fit" or correspondence. The advertising inventory is managed in one implementation via the promotion campaign management system 206 (and associated advertisement decision maker process).

Subscriber privacy and anonymity are maintained in one embodiment via, e.g., hashing or encrypting data relating to the CPE and/or subscriber, thus ensuring that stored data is not traceable to a specific user account. The hashing process may be accomplished in a variety of ways. For example, in one embodiment, a one-way cryptographic hashing function is utilized, such as the hashing functions described in co-owned U.S. patent application Ser. No. 11/186,452 filed Jul. 20, 2005 and entitled "METHOD AND APPARATUS FOR BOUNDARY-BASED NETWORK OPERATION," which is incorporated herein by reference in its entirety. The MAC address, TUNER ID, and/or TUNER USE variables are hashed so that the identity of the originating CPE/subscriber are anonymous. In this manner, subscriber privacy is effectively maintained.

In alternative embodiments, only information that has been designated by a consumer or user (e.g., by "opting in") is eligible for content collection and/or analysis by the campaign management system 206. In this manner, subscriber privacy is effectively safeguarded, and user control of their private information (including for example preferences or user profile) is protected as well.

Additionally, the methods and apparatus discussed in previously incorporated co-owned U.S. patent application Ser. No. 12/503,710 filed on Jul. 15, 2009, entitled "METHODS AND APPARATUS FOR TARGETED SECONDARY CONTENT INSERTION" , and issued as U.S. Pat. No. 8,813,124 on Aug. 19, 2014, may be utilized for managing advertisement or promotion campaigns. As discussed therein, data relating to audience or viewer qualities is identified, created and distributed via the advertisement management system and an associated advertisement decision maker. An advertising "inventory" is created and related to audiences by combining the audience data with advertisement placement opportunities. The promotion campaign management system 206 may further measure and manage such advertising inventory. Such measurement provides inter alia an accounting of sold inventory, and measurement accumulated over time allows the value of the inventory to be realized. These methods and apparatus give a network operator or other entity the ability to offer new inventory with a high degree of confidence that booked orders will meet their audience penetration or "impression" goals or targets.

In one embodiment of the present invention, the apparatus and methods discussed herein are further adapted to manage advertising campaigns for one or more advertisement/promotional providers in order to, for example, increase advertising or associated sales revenue for an MSO, as well as to increase the likelihood a particular advertiser will reach its targeted audience as precisely as possible (and within any limitations of an advertiser-MSO defined relationship).

In addition, the campaign manager 268 (and/or the promotion campaign management system 206) may be configured to enable a network operator to configure various campaign parameters. In one embodiment, a network operator may set a time value threshold (such as e.g., 5 minutes past the start time), after which the system will, rather than recording a currently broadcast episode, "roll" the recording to apply to a subsequent episode. Rolling episodes as described herein may be accomplished for example via a Boolean operator which, when true, indicates that the current episode has passed the pre-determined threshold time value, and causes the media functionality server to automatically schedule a recording of the next scheduled episode instead.

It will also be appreciated that the threshold may vary (even dynamically) as a function of the program, its content, and/or yet other parameters. For example, in one such implementation, an algorithm is used to analyze the content of the program element (such as via speech recognition technology, embedded indicators or cues, metadata, scores, etc.) to determine context associated with the content, which can be used to assess how far into a program that the threshold can be set. Certain programming (such as a hockey game for instance) may have a comparatively long duration, and little meaningful action during the first portion thereof. Consider the case where the game is scoreless in the first period, and is an early-season game (such that there are no playoff implications); such a game may have a very "deep" or latent threshold. Alternatively, an episode of a highly dramatic one-hour series will likely have meaningful (and even essential) content within the first few minutes, and hence would merit a very shallow or short threshold.

The foregoing logic may also apply to the functionality option of providing a reminder and/or forced tuning. Additionally, the foregoing logic may apply to instances where the operation (e.g., reminding, recording, and/or force tuning) is selected at a first device, yet is performed at one or more second devices (and optionally also at the first device).

In another embodiment, the network operator may configure a time value threshold (i.e., a length of time into the program broadcast), for ceasing display of certain ones of a "record", a "remind" and/or a "tune" media function in promotional content (having embedded triggers for the media functions as discussed herein). For example, the network operator may be able to configure length of time into the program when the recording option should no longer be offered, such that if the linear advertisement or promotion happens to be displayed in the first several minutes of the intended target program, then within a certain time range, the overlay or trigger used to schedule a recording may still be selectable. The recording may occur on the device which selects the option and/or on other devices associated therewith.

In yet another embodiment, the user configurable parameters at the campaign management system may further include a configuration element to indicate whether a selected media function has been previously scheduled at the selecting device and/or other devices associated therewith. Upon viewer selection of a particular media functionality or option, the system utilizes information stored at e.g., the media functionality server to determine whether previous instances of the same function have already been scheduled for the promoted event. Then, using a Boolean element, the system indicates whether a follow-up message should be displayed. The follow-up message indicates that the previous media function has been scheduled thereby reminding the viewer that a scheduled recording/reminder/force-tune for the program already exists. Exemplary follow up messages may be seen at e.g., FIG. 2b, items 291, 294, 295, 297, and 298. Additionally, if other unselected media options remain, the system may offer these options to the viewer as illustrated in the messages given at e.g., FIG. 2b, items 292, 293, and 296.

As noted above, the campaign manager 268 and/or the promotion campaign management system 206 may be configured to enable a network operator to configure various campaign parameters; i.e., define specific parameters associated with a particular EBIF application in an interactive campaign. In addition to the campaign manager 268, a Customer Relationship Management (CRM) or Sales Management System (SMS) and traffic and billing elements are also required to enter and implement the configurable parameters. An exemplary embodiment of a user interface for enabling configuration of various parameters of a campaign via a campaign manager or other entity is illustrated at FIG. 2c.

The campaign manager 268 and/or the promotion campaign management system 206 of the exemplary embodiment is further configured to identify enhanced TV binary interchange format (EBIF) applications which have been selected (such as by a network operator) as configurable applications for bearing media functionality options. When a network operator enters a new campaign and selects a configurable application, the campaign manager enables the user to select (e.g. from a drop down list) the network on which the promoted event is associated to. The networks from which the user may select may be limited to those networks available in the particular market(s) and/or zone(s) in which the campaign is predetermined to run. The available networks are listed in a way that is easily recognizable to a user, and avoids unnecessarily duplicating different named networks carrying the same content. That is to say, it is often the case that an MSO will create multiple versions of the same network; for example, the city of Cleveland may have the following "networks" in its channel maps: WEWS Cleveland ABC, WEWS Live Well, WEWS Simulcast, WEWS/ABC, WEWS/ABC HD, WEWSHD, and WEWS-Test. Certain ones of these "networks" (for example WEWS-Test, WEWS Live Well) are not "networks" associated with actual subscriber viewership, while others represent valid versions of the same network. To avoid confusion, the content manager 268 and/or the promotion campaign management system 206 will instead provide user-friendly names such as e.g., "ABC Affiliate". The media functionality system then translates the user-friendly name to the particular one of the versions of the network for which actual viewership occurs, and selects one standard definition (SD) version and one HD (where available) version for scheduling recordings. For each user-friendly named network, the campaign manager 268 and/or the promotion campaign management system 206 provides (in addition to the user-friendly name), a logo associated with that particular network.

Additionally, the campaign manager 268 and/or the promotion campaign management system 206 allows the user to select a date (such as through a calendar control) on which the promoted event will broadcast, or is otherwise available for viewing and recording. When providing a date selection control, restrictions may be placed on the available dates to those later than the current date, but less than or equal to a designated end time of the campaign. For example, in one implementation, the user may alternately select either: (i) the local time to start a recording, along with a duration of the promoted event, or (ii) a program name associated to the promoted event (e.g. from a drop down list). In the instance the user selects the program name, the system may use previously entered date/time and/or network information to narrow the list of available names for selection to only those programs which run on the specified network and/or at the specified date/time.

As noted above, various time threshold values are utilized in exemplary embodiments of the invention for comparison to a current time when the system determines whether to enable or disable a particular media functionality or option. The campaign manager 268 and/or the promotion campaign management system 206 are therefore configured to enable the user to enter a specific time period for e.g., rolling a recording to a next episode instance, providing information regarding an existing selection for a particular media functionality option, and/or disabling a record and/or remind option. To this end, the user may be provided via an interface to the campaign management system (such as that of FIG. 2c), an ability to designate a "Roll Episode", "Follow up", "Record Series" and/or "No Record Time" indicator. In the case where the user designates any of these, a selectable/deselectable indicator for providing this functionality and additionally for entering a time period (where necessary) is provided. Selection/deselection of the indicator allows the user to differentiate between episodic and non-episodic (or non-series) content.

The system may establish certain ones of the aforementioned features as being selected by default, yet capable of deselection. Additionally, the system may establish a default time window or threshold of e.g., five (5) minutes into a program for disabling certain media functionality options, as described supra. In addition, a "No Record Time" indicator (i.e., an indicator which disables a record function after a given time threshold) may be provided a selectable range of time threshold values based at least on the scheduled length of the promoted event, and/or some duration established by the system.

The exemplary embodiments of the invention further provide mechanisms to account for and maintain continued operation over arbitrary plant and/or configuration changes within the network (which may occur unexpectedly). Such plant changes may include, e.g., (i) modification of a service name, (ii) modification of the service ID(s) associated with a particular station, and (iii) modification of the source ID(s) associated with particular content. In the instance a change cannot be automatically managed, an alert is transmitted to one or more network operators and/or users via e.g., email. The message comprises information indicating e.g., the change, the number of active campaigns affected, and the number of total campaigns affected. In addition, records containing information regarding changes may be stored and accessed for reporting, servicing, and error correction.

Referring back again to the exemplary embodiment of FIG. 2a, an interactive server 270, HTTP entity tag (ETAG) entity 254, and ETAG proxy 264 are also illustrated as being in communication with the advertisement management system 256, campaign manager 268 and RRR server 252. The foregoing entities are utilized for trigger insertion management (as is performed by the insertion management entity 204 of FIG. 2 above).

Figure 2B:
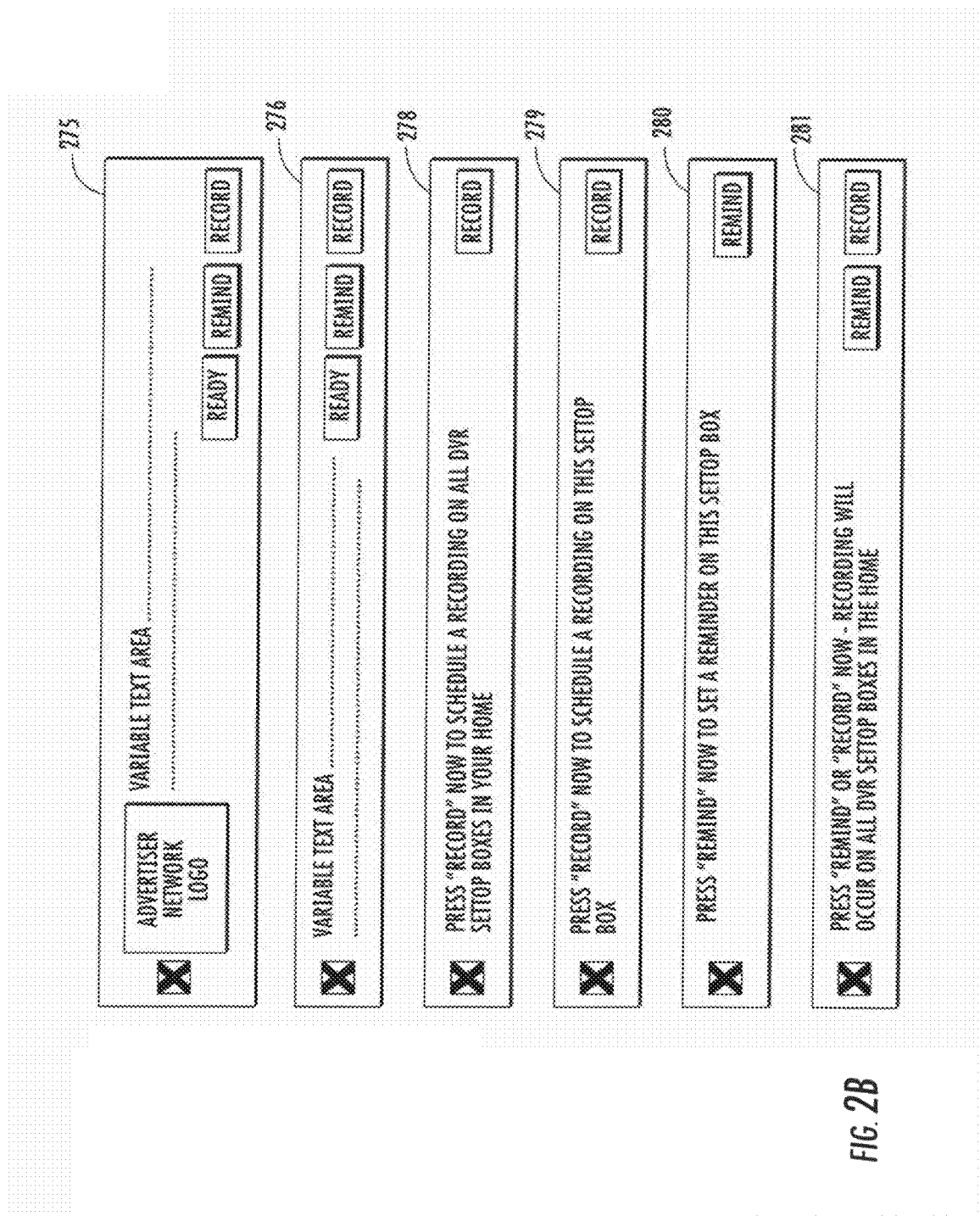
FIG. 2b is an illustration of various exemplary media functionality triggers that may be embedded within a promotion according to the present invention.
Figure 2B:
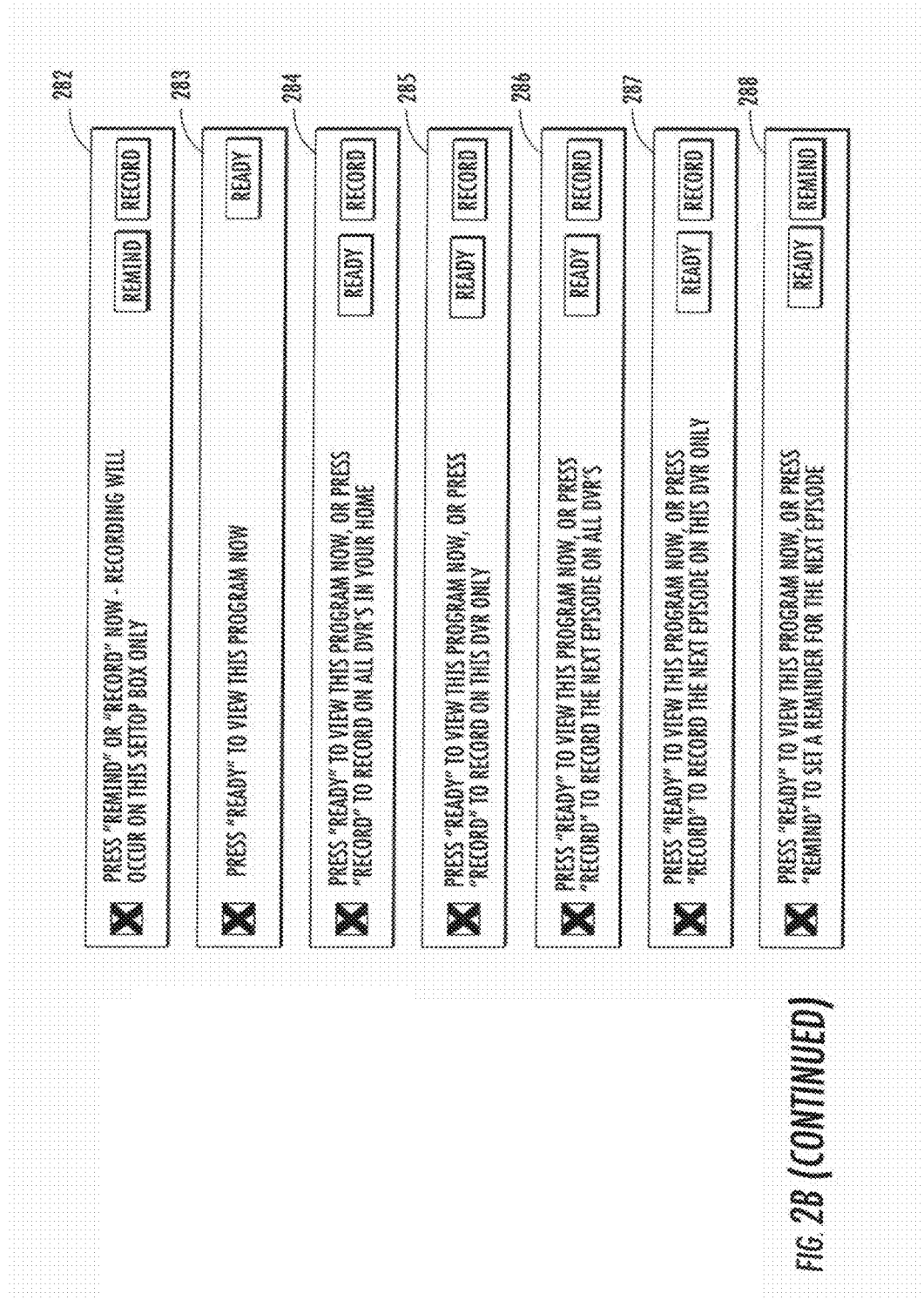
Figure 2B:
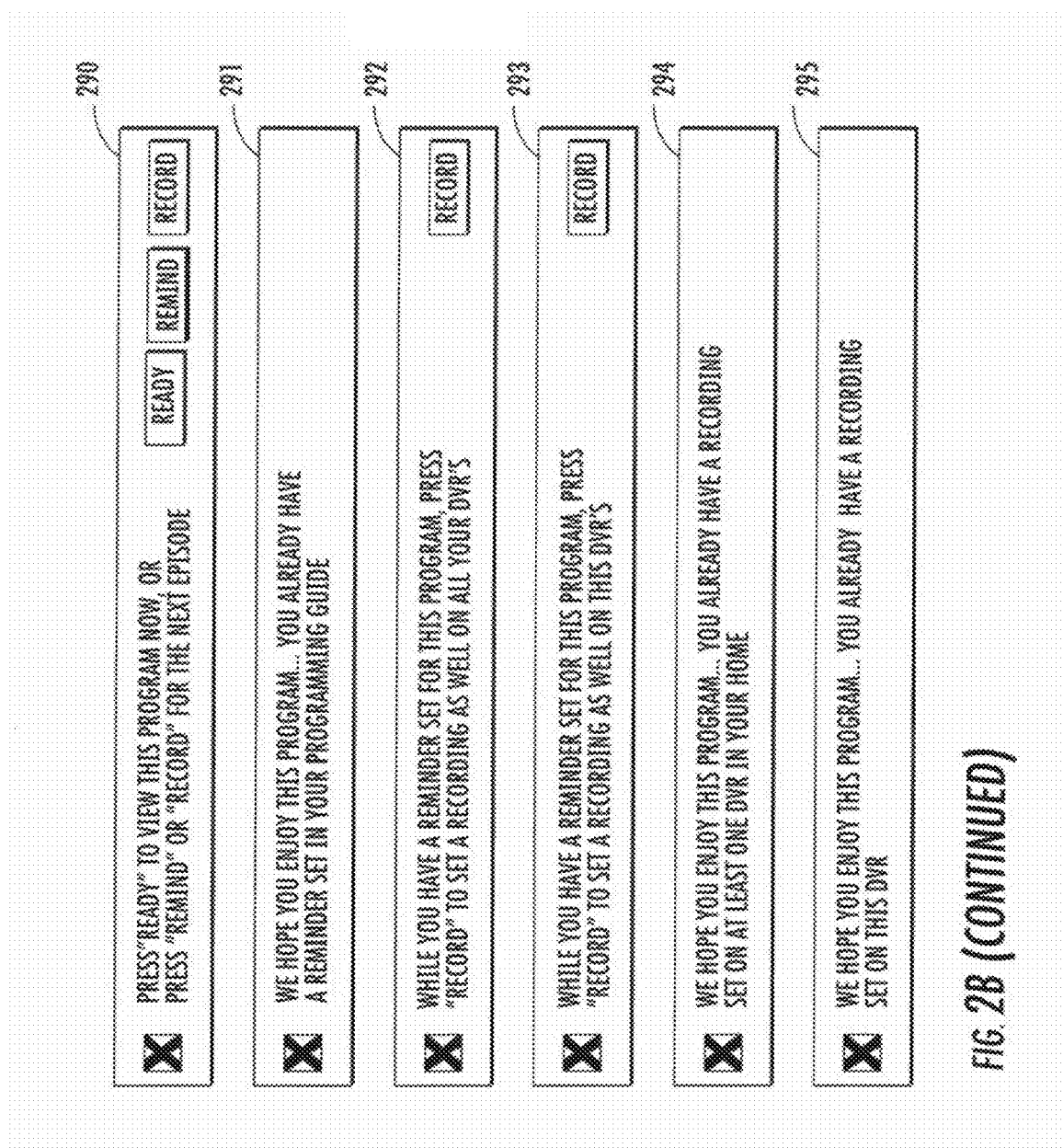
Figure 2B:
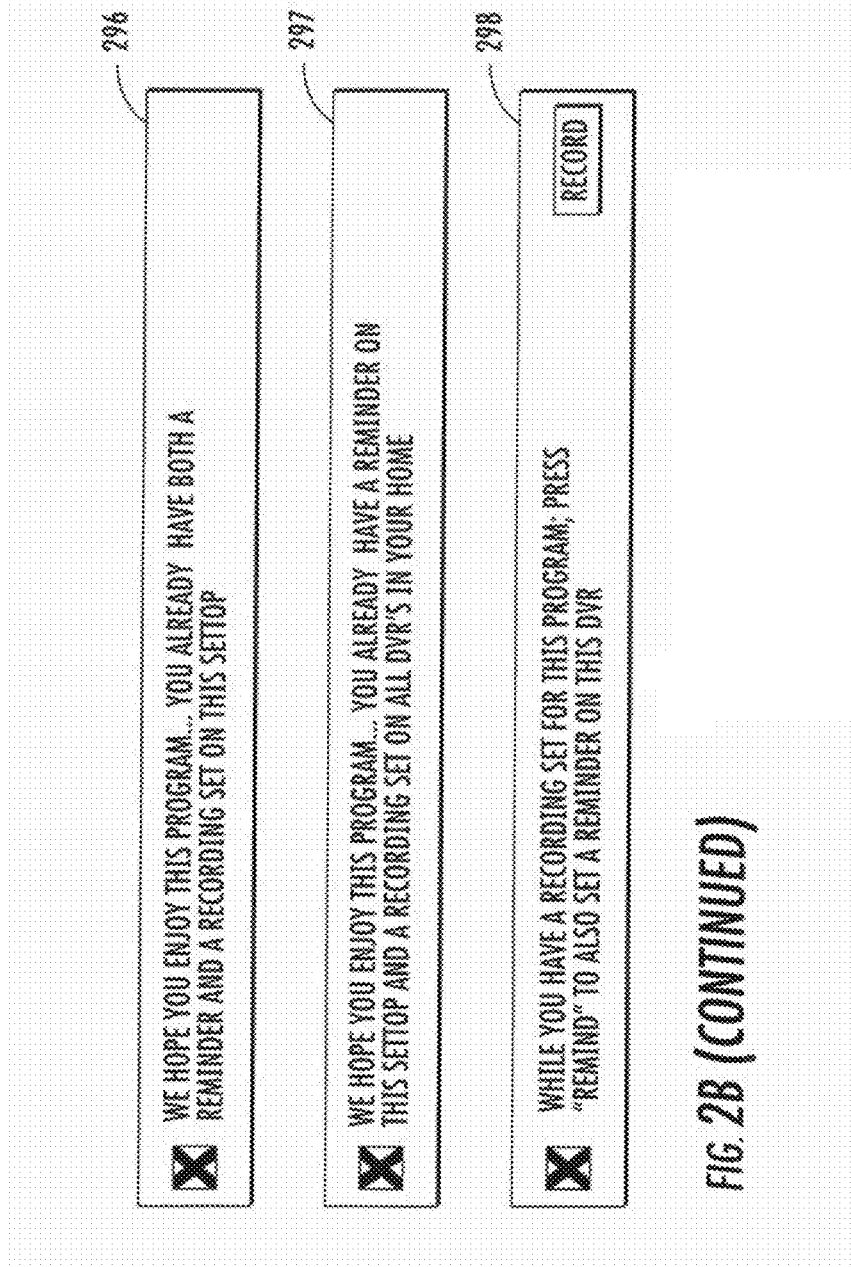
Figure 2C:
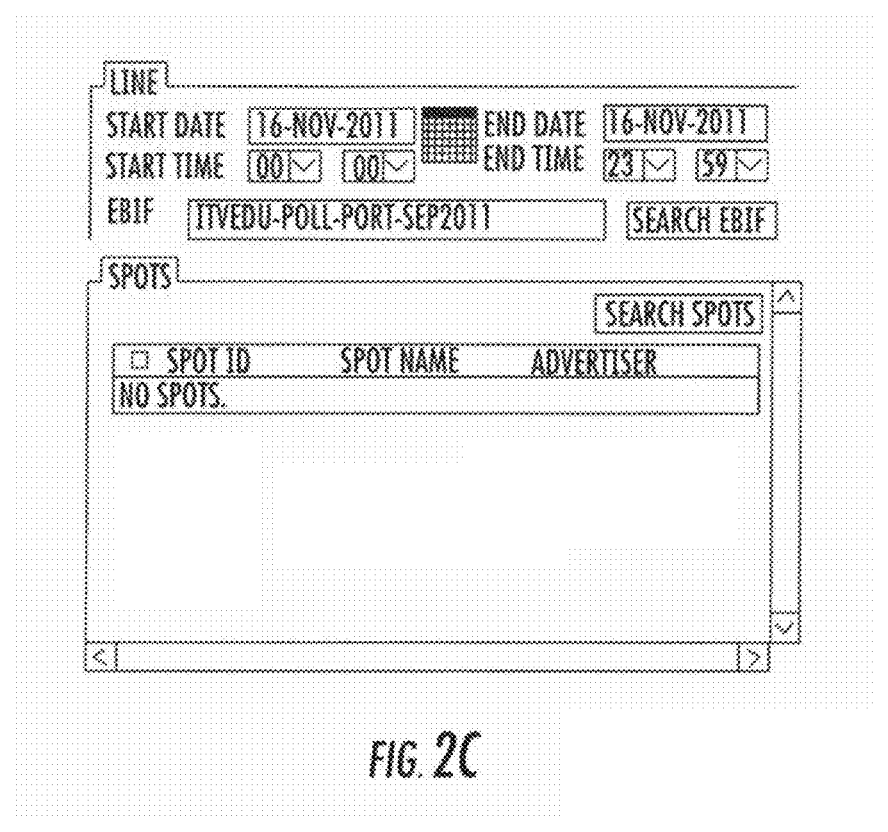
Figure 2C:
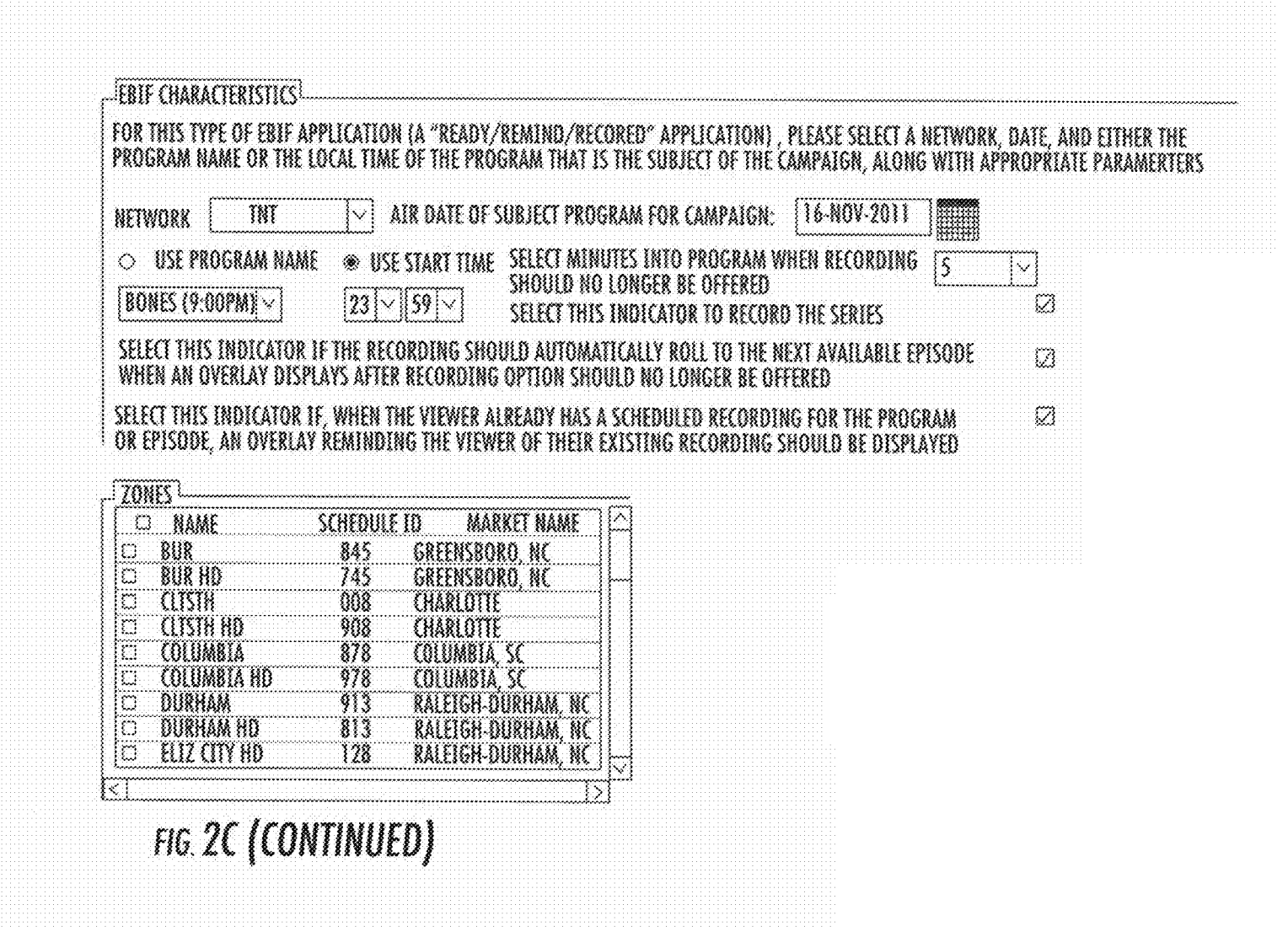

As shown in FIG. 2a, the interactive server 270 provides templates for the various media functions. The items 275 and 276 of FIG. 2b illustrate two exemplary templates useful with the invention; however, other configurations and designs will appreciated by those of ordinary skill given the present disclosure (the illustrated templates being merely exemplary of the general concepts). The interactive server enables an operator to author interactive advertisements (iAds) using existing templates for distribution to the ETAG entity 254 according to the campaign established by the campaign manager 268 and/or advertising management system 256.

The interactive advertisements generated at the interactive server are provided to the ETAG entity 254, which uses information gained from e.g., the RRR server 252 and/or the advertisement management system 256 to insert appropriate text, process, and finalize the embedded trigger messages which are sent to the CPE 106. Examples of various exemplary finalized embedded trigger messages are shown at e.g., FIG. 2b and will be discussed individually in detail below. The ETAG entity 254 further inserts application and signaling information into the MPEG stream which is transmitted to the CPE 106.

In the illustrated embodiment, the ETAG system 254 causes the interactive application to be streamed to the CPE 106. The ETAG proxy 264 is an optional device, which assists in routing EBIF traffic from CPE 106 to the headend systems in the instance that these do not communicate directly. The ETAG proxy 264 identifies and routes traffic from the CPE 106 to individual servers at the headend. For instance, the ETAG proxy 264 may route non-standards based traffic away from headend servers which expect or are configured only for standards-based traffic (e.g. IAM messages destined for ETAG), and instead route this traffic to server entities configured to handle non-standards based traffic. In one exemplary implementation, the ETAG proxy 264 is configured to communicate between the RRR server 252 and the CPE 106. The ETAG proxy 264 receives proprietary HTTP communications from the CPE 106, and transmits these to the RRR server 252. The RRR server 252 in turn aggregates such communications from the CPE 106, and distributes them to the AM system (allowing for appropriate anonymization) in order to allow, inter alia, integrated cross platform effectiveness reporting.

In one embodiment, the embedded trigger messages utilize enhanced TV binary interchange format (EBIF) as disclosed in Open Cable™ Specification entitled "Enhanced TV Binary Interchange Format 1.0" OC-SP-ETV-BIF1.0-I06-110128 dated Jan. 28, 2011 and incorporated herein by reference in its entirety. However other interactive content formats may be used as well consistent with the invention.

The CPE 106 are configured to receive content from the network. The interactive content (i.e., embedded triggers for providing media functions) are also provided within a content stream in the exemplary implementation. The CPE 106 display the overlay (such as those illustrated in FIG. 2b) which comprises the appropriate text as inserted at the ETAG entity 254 and generated or stored at the RRR server 252. Various selectable virtual "buttons" or icons are also displayed, which upon selection thereof trigger messages to be transmitted from the device 106 upstream to the network. For example, if a user of the device 106 selects a "remind" virtual button, a signal is received at the network which indicates that the particular device is to be reminded about a promoted event at a given date/time. At the given date/time, a reminder message is transmitted thereto.

It is appreciated that the triggers may be configured to remain inactive (or unselectable) until a signal is received from the network activating the buttons. In this manner, the campaign manager 268 or other entity may ensure that an entire promotion was viewed prior to selection of a function thereof.

The exemplary CPE 106 may comprise for example a set top box (STB), a digital video recorder (DVR), gateway, or any number of consumer devices. For example, the CPE 106 may comprise PCs, laptop computers, portable music players (e.g., MP3 players, iPods™, etc.), portable video players, cameras, video recorders, smart phones, tablet computers, etc., which are coupled to the network via any number of different interfaces. The CPE 106 is configured to receive a plurality of video formats of various resolutions and bitrates including, without limitation, MPEG-1, MPEG-2, MPEG-4, AVC/H.264, WMV, VC-1, AVI and Real.

The CPE 106 is not required to contain a decoder for decoding audio/video/media; however, it will be recognized that such decoder capability (as well as transcoding, e.g. decoding in a first format and then encoding in a second format) and/or transrating capability (i.e., processing so as to change bitrate, or establish a constant bitrate output) can be implemented within the CPE 106 or associated device if desired.

In one exemplary embodiment, the CPE 106 is compliant with OpenCable™ Home Networking Architecture as disclosed in OpenCable™ Specification Home Networking Protocol 2.0 (OC-SP-HNP1.0401-080418 dated Apr. 18, 2008), which is incorporated herein by reference in its entirety. As discussed therein, a compliant CPE 106 includes, inter alia, compatibility with the Digital Living Network Alliance (DLNA) requirements such as DLNA version 1.0 or the later version thereof. This capability allows, among other things, rendering of content in DLNA 1.5 format.

In another exemplary embodiment, the foregoing apparatus and network configurations may further enable a first client device 106 to schedule a recording, schedule a reminder, and force-tune (including scheduling a force-tune event for a future date/time) other devices in communication therewith. For example, a first CPE 106 may receive a promotion with an embedded trigger associated to a media functionality option. The first device may select the trigger, and then assign one or more second devices to be triggered to record, be reminded, and/or tune to the promoted event. Alternatively, the first and second devices may both be signaled to record, remind and/or be tuned to the promoted event. Examples of such device control are discussed in previously referenced U.S. patent application Ser. No. 10/948,271 filed on Sep. 22, 2004 and entitled "SCHEDULING TRIGGER APPARATUS AND METHOD", co-owned, co-pending U.S. patent application Ser. No. 11/460,095 filed on Jul. 26, 2006 and entitled "SCHEDULING TRIGGER APPARATUS AND METHOD". In addition, the aforementioned concepts may be used to create a home network such that, when a trigger is selected in on one home device, the user may select to simultaneously (or alternatively) select other devices in the home to receive the content, schedule a recording, receive a reminder, etc.

The CPE 106 physically and logically interfaces with other CPE 106. The present invention also contemplates the use of different types of physical/logical interfaces, including a substantially universal or converged interface (such as USB 2.0, USB 3.0, HDMI, IEEE-1394, DisplayPort, Thunderbolt, etc.), or alternatively, a plurality of discrete interfaces.

As will be discussed in greater detail below, in one implementation, the CPE 106 acts as a "converter" of sorts, converting content and data received at the CPE 106 to a format suitable for the one or more second CPE 106.

Moreover, content transmission between client devices may further include rights management (e.g., Digital Rights Management (DRM)) and/or copy-protection mechanisms. For example, "protected" content may be delivered to the CPE 106 with the appropriate security package. The CPE 106 receives and authenticates the security package. In one variant, no rendering or recording device (e.g., CPE 106) is permitted to render or record protected content without proper authentication of itself to the network, and authentication of the security package. Still further, authentication (such as by previous registration of the devices to the CPE 106) may be required prior to the delivery of protected content from the CPE 106 to other devices.

In another variant, the rendering device is configured to authenticate the source of the content (i.e., will only render or record content from an authenticated source). For example, the apparatus and methods described in co-owned U.S. patent application Ser. No. 11/080,693 entitled "METHOD AND APPARATUS FOR NETWORK CONTENT DOWNLOAD AND RECORDING", filed Mar. 14, 2005, and issued as U.S. Pat. No 8,028,322 on Sep. 27, 2011, incorporated herein by reference in its entirety, can be used to provide such functionality, although other approaches may be used as well.

As indicated above FIG. 2b, illustrates various messages or overlays with selectable triggers that may be displayed to a viewer according to the present invention.

The message of item 278 of FIG. 2b is displayed to enable a viewer to record a program (promoted in the promotion on which the message is overlaid) on all boxes in the viewer's home. Item 279 is displayed to enabling only on the viewer's current CPE or settop box.

The message 280 is an exemplary "remind" message which is to be displayed to viewers to enable them to schedule reminders. The messages illustrated at items 281 and 282 of FIG. 2b enable a user to additionally or alternatively schedule a reminder and/or a recording at all devices in the home and at the current device only, respectively. An ability to select from among a list of devices may also be provided.

The message 283 of FIG. 2b is an exemplary "ready" message which is to be displayed to viewers to enable them to tune to an in progress broadcast or other immediately available content (such as e.g., PPV content, DVR or NPVR content, on-demand content, etc.). The messages illustrated at items 284 and 285 enable a viewer to additionally or alternatively cause other devices within the home network to automatically tune to and/or record a program at all devices in the network and the current device only, respectively. An ability to select from among a list of devices may also be provided. In the instance a currently broadcast of the promoted content has passed a predetermined time threshold (e.g., more than 5 minutes into the playback), the messages of items 286 and/or 287 may be displayed.

In the instance a program promoted in an advertisement has already begun, the messages 288 and/or 289 may be displayed to enable a viewer to view the in-progress content and/or set a reminder, and/or recording for the next episode or subsequent iteration of the program (such as in the instance a particular movie will show more than once on a given channel within a time period).

As discussed elsewhere herein, in some instances, a user may have previously scheduled particular media function at the time they select the same function from the embedded trigger on a promotion or advertisement. The message 291 for example, may be displayed in the case a "reminder" function is selected after having previously scheduled a reminder.

The message 294 may be displayed in the case a "record" function is selected after having previously scheduled a recording.

In another variant, further media options may be displayed following a selection of a repeated function. For example, the messages 292 and/or 293 may be displayed to enable the additional function of recording either at all of the devices in the home network, or only at the device on which the message is displayed if a user selects to be reminded of a promoted event for which a reminder was previously scheduled.

The message 296 may be displayed to schedule a reminder if the user selects to record a promoted event for which a recording was previously scheduled. An ability to select from among a list of devices on which the additional media functions will occur may also be provided.

Finally, in the instance no additional media functions exist, the messages 297 and/or 298 may be displayed.

Information indicating that a particular media functionality trigger has displayed and information listing a reason for the display of the trigger are stored at e.g. the media functionality server and/or the RRR server. Records regarding the display thereof are configured to be stored in such a way that they may be extracted through both a common database and service bus methods. Such records may be used, as discussed below, for reporting and performance purposes.

While illustrated above in the context of media functions occurring on a single device or all devices in the viewer's home, it is appreciated that one or more of the foregoing messages may be adapted to further enable a user to select particular ones of devices associated therewith on which to e.g., schedule a reminder and/or recording, cause a tuning event, etc.

It is also appreciated that the foregoing apparatus may be further utilized to perform the foregoing media functionality options (such as e.g., scheduling a recording, scheduling a reminder, and/or automatically tuning) across multiple programs or content types. For example, an embedded trigger and associated message may be overlaid on a promotion or advertisement for a particular television series. The message enables the viewer to perform the function (e.g., record/remind/tune) for all episodes of the series despite date/time, channel, etc., or elect some or all media function options for only new episodes or those appearing on a particular channel and/or at a particular date/time.

In another variant, the overlays may be "telescopic" in nature such that interest in a first promoted event may prompt the system to provide additional viewer options. For example, the viewer may be provided an opportunity to select an interest in a particular genre or actor and enable one or more of the media functions for all movies, all television programs, etc. with the particular actor or of the particular genre upon selection of a first promoted event of the given actor and/or genre.

In yet another embodiment, the system may, upon user selection of a media functionality option (such as e.g., "remind" and/or "record"), determine whether a related content has been previously stored at a storage entity associated to the user device, and suggest viewing of that content. For example, if a user selects to be reminded of a television series (promoted event), the system may determine whether other instances of the series are already recorded on the user's device (e.g., DVR), and provide a message enabling the user to tune to the recorded previous episode.

In another example, the user may select to record a particular movie promoted in an advertisement. Upon selection of the "record" function, the system may determine that the user has previously recorded the given movie, and therefore suggest the user view the previously recorded version as opposed to and/or in addition to recording the new instance.

In another variant, the system may determine that the user has previously recorded other content which is similar to the promoted content (such as content which is by the same director, has the same actor(s), and/or is of the same genre) and suggest viewing of this content instead and/or in addition. It is still further appreciated that the system may further determine whether the user has viewed a previously recorded content (e.g., a previous episode or the same or related content) and remind the user of this fact.

Still further, the exemplary apparatus and methods of co-owned, co-pending U.S. patent application Ser. No. 12/414,576 filed on Mar. 30, 2009 and entitled "RECOMMENDATION ENGINE APPARATUS AND METHODS" may be utilized to further provide content recommendations. As discussed therein, content targeted to a user or group of users based on selections made at the user devices may be identified and recommended. In particular, mechanisms may be provided for particularly selecting content to align with a user's preferences (the latter which the viewer need not enter manually). The content provided to the user is compiled from various distinct sources, including, inter alia, DVR, broadcasts, VOD systems, start over systems, etc. Additionally, the system may learn (and unlearn) the user's preferences and which content they are likely to enjoy based on actions taken with regard to the content and present these as options within further promotions. The recommended content may alternatively be displayed as a list or table of titles (and related information of interest), or fed to the user as a continuous content stream on a virtual channel. In another embodiment, the compiled content is presented to the user in conjunction with an electronic program guide (EPG) which may be personalized to that user if desired. Any of the foregoing mechanisms discussed above may be further provided therein, the herein discussed embedded triggers for providing the discussed media functionalities (such as in the form of overlays, etc. discussed herein).

Methodology—

Figure 3:
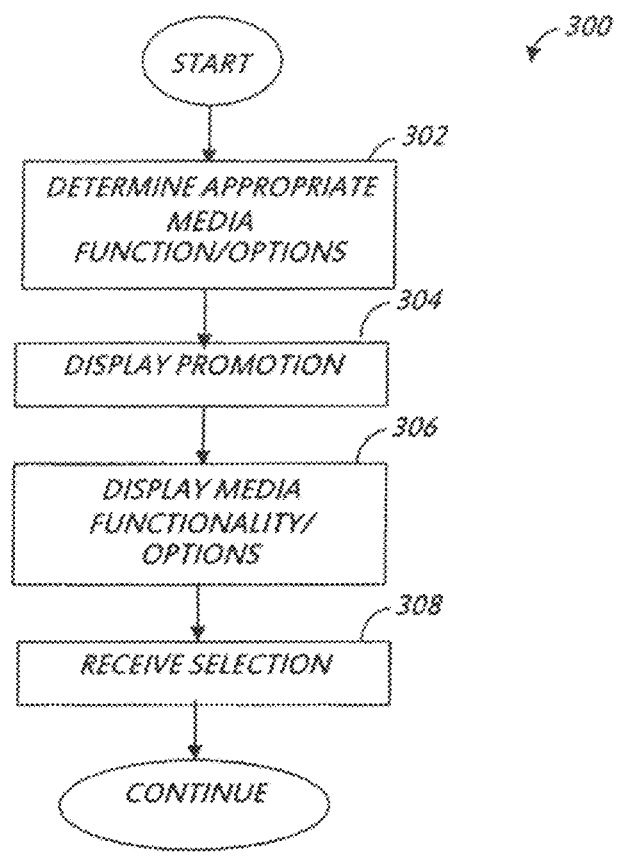
FIG. 3 is a logical flow diagram illustrating an exemplary embodiment of a method for displaying media functionality options to a viewer.

Referring now to FIG. 3, one embodiment of a generalized method 300 for enabling media functionality/options is illustrated and described.

As shown, per step 302, appropriate media functionality options are determined for a particular promotion. The appropriate options may be established by a network operator via an insertion management entity, campaign management system, and a media functionality server (as individual entities or as multiple entities having the functionality of each distributed across multiple individual entities). As will be discussed in greater detail below, certain media functions may only be offered at particular times or for particular content types, etc.; hence, the aforementioned determination step takes into account these rules (as entered at the insertion management system and/or the media functionality server) as well as rules established to ensure the promotion manager's needs are met (as entered via the campaign management system).

Next per step 304, the promotion is displayed on a user device. As noted above, the promotion includes at least one embedded interactive trigger function. The embedded interactive trigger function enables display of a respective at least one media functionality option (step 306). The media functions are represented in the promotion by selectable icons configured to be selected by a user via a user interface. Upon selection of at least one of the selectable icon (step 308), a media functionality is enabled.

Figure 3A:
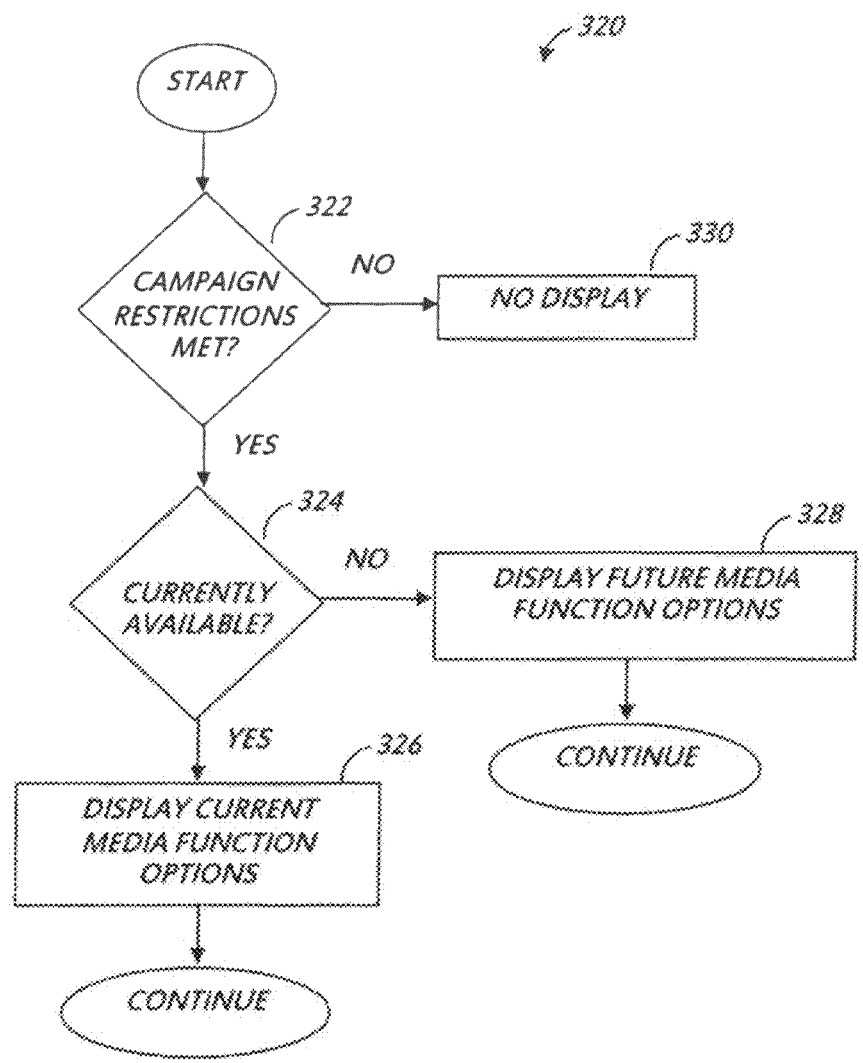
FIG. 3a is a logical flow diagram illustrating an exemplary embodiment of a method for determining which media functionality options to delivery to a viewer.

Referring now to FIG. 3a, an exemplary method 320 for determining appropriate media function options to display in conjunction with a promoted event is shown and described. As shown, per step 322, it is first determined whether campaign restrictions are met. In one example, the campaign restrictions may be set forth by a network operator, and are stored at one or more entities comprising a promotion campaign management system (as discussed above). In one embodiment, the campaign restrictions include restrictions as to which of a plurality of promotional events are to have media functions associated therewith. Additional restrictions may include a number of times the promotional event may be displayed with an associated media functionality, and other limitations on the delivery of the promotional content (e.g., secondary content, or advertisement) itself. If campaign restrictions are not met, no media functionality options are displayed (step 330).

When it is determined that a particular promotion will not be associated to an overlay comprising an embedded trigger, information regarding this decision (including a reason for the decision and other descriptive information) is stored at e.g., the media functionality server and/or the RRR server. As noted previously, this information is used for reporting and performance purposes and is made accessible via a common database and service bus methods.

Other restrictions which may be evaluated at this step include for example determinations as to the capabilities of the subscriber devices associated to an account, the number of devices associated to an account, and/or the service address associated to the account (in order to determine geographic constraints on promotions, media functionality options, etc.).

If the campaign restrictions are met, it is next determined at step 324 whether the content being promoted in the promotion or advertisement is currently available. This determination is made in the exemplary implementation by comparing a current time to metadata indicating a date and time for the promoted event and/or by consulting a channel line-up server, an EPG generator, or the EPG itself.

Programming content which is not currently available will have displayed therewith future media functionality options (step 328); programming content which is currently available will have displayed therewith current media functionality options (step 326). That is to say, certain media functionality options may only be appropriate when content is currently available for viewing (such as e.g., a tune immediately option); hence, such options may only be displayed when the content is currently available. Other options (such as e.g., a reminder option) may only be appropriate for content which will display at some time in the future, therefore these are only appropriate when the promoted content comprises content which is not currently available but will be at a future date/time.

In one embodiment, the various media functionality options include e.g., (i) causing the device which selected the option to tune to the promoted event immediately, (ii) enabling the device which selected the option to cause one or more additional devices to tune to the promoted event immediately, (iv) causing the device which selected the option to tune to the promoted event at some date/time in the future, (iv) enabling the device which selected the option to additionally cause one or more other devices to tune to the promoted event at some date/time in the future, (v) causing a reminder regarding a promoted event to be sent to the device which selected the option, (vi) enabling the device which selected the option to identify one or more additional devices to receive reminders regarding a promoted event, (vii) causing a recording device associated with the device which selected the option to record content, and/or (viii) enabling the device which selected the option to cause one or more recording devices associated with one or more respective other devices to additionally record content.

It is further appreciated that the programming content may in one embodiment comprise episodic or recurring content. Hence, the aforementioned media functionality options may further comprise options for forced tuning, recording, and/or reminding at each instance of recurrence of the programming content. It is appreciated that the force tune event as discussed herein may comprise tuning to currently broadcast or immediately available content, and/or storing a signal to cause one or more devices to tune to the event at the date/time (in the future) it becomes available for viewing. Methods for enabling various ones of these media functionality options are discussed with respect to FIGS. 4-6 below.

Media Functionality Options—

Figure 4:
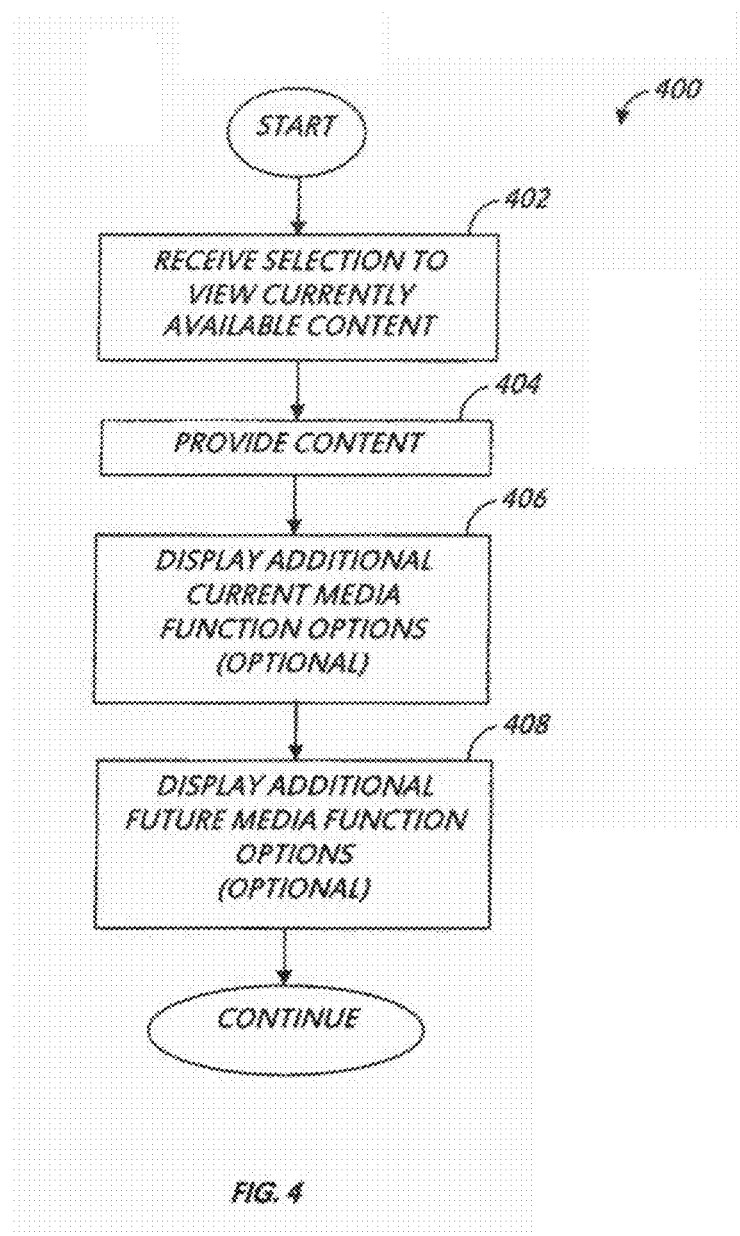
FIG. 4 is a logical flow diagram illustrating an exemplary embodiment of a method for enabling a media functionality option to view currently available content.

Referring now to FIG. 4, an exemplary method 400 for enabling a media functionality option to view currently available content. Per step 402, a media functionality server receives a selection of an option to view currently available content. The current availability of the content is determined in one implementation based on a type of content and a comparison of a current time to a start time and duration (where appropriate). For example, DVR and VOD content are always immediately available, whereas broadcast content may only be available from a scheduled start time through the duration of the broadcast to a scheduled end time.

At step 404, the currently available content is provided to the requesting subscriber. Concurrent to the display of the requested promoted event, per step 406, additional current media functions/options are optionally displayed. For example, as an overlay to the promoted event or the promotion, a subsequent message is provided to the user having one or more additional and selectable media functionality options available to the currently available program. In one exemplary embodiment, the current media function option comprises an option to additionally record the promoted event. However, as noted above, one or more previously established configurable rules or parameters must be consulted to determine whether a program is within a recording time period prior to providing the "record" function to the viewer.

At step 408, additional future media functions/options are optionally provided to the viewer. As discussed above with respect to the optional display of additional current media options, the optional display of the future media options may be provided as an overlay to the promoted event or may continue to be displayed within promotion. The future media options are presented in subsequent message(s) provided to the viewer providing options to the viewer with respect to It is noted that in the instance the subsequent options are provided as an overlay to the promoted event, the exemplary system is configured to cause the requesting device to tune to the promoted event (in accordance with the viewer's selection of the request to view currently available content). Then, using a subsequent EBIF application, a new message is presented having the media functionality options represented as selectable icons.

Figure 5:
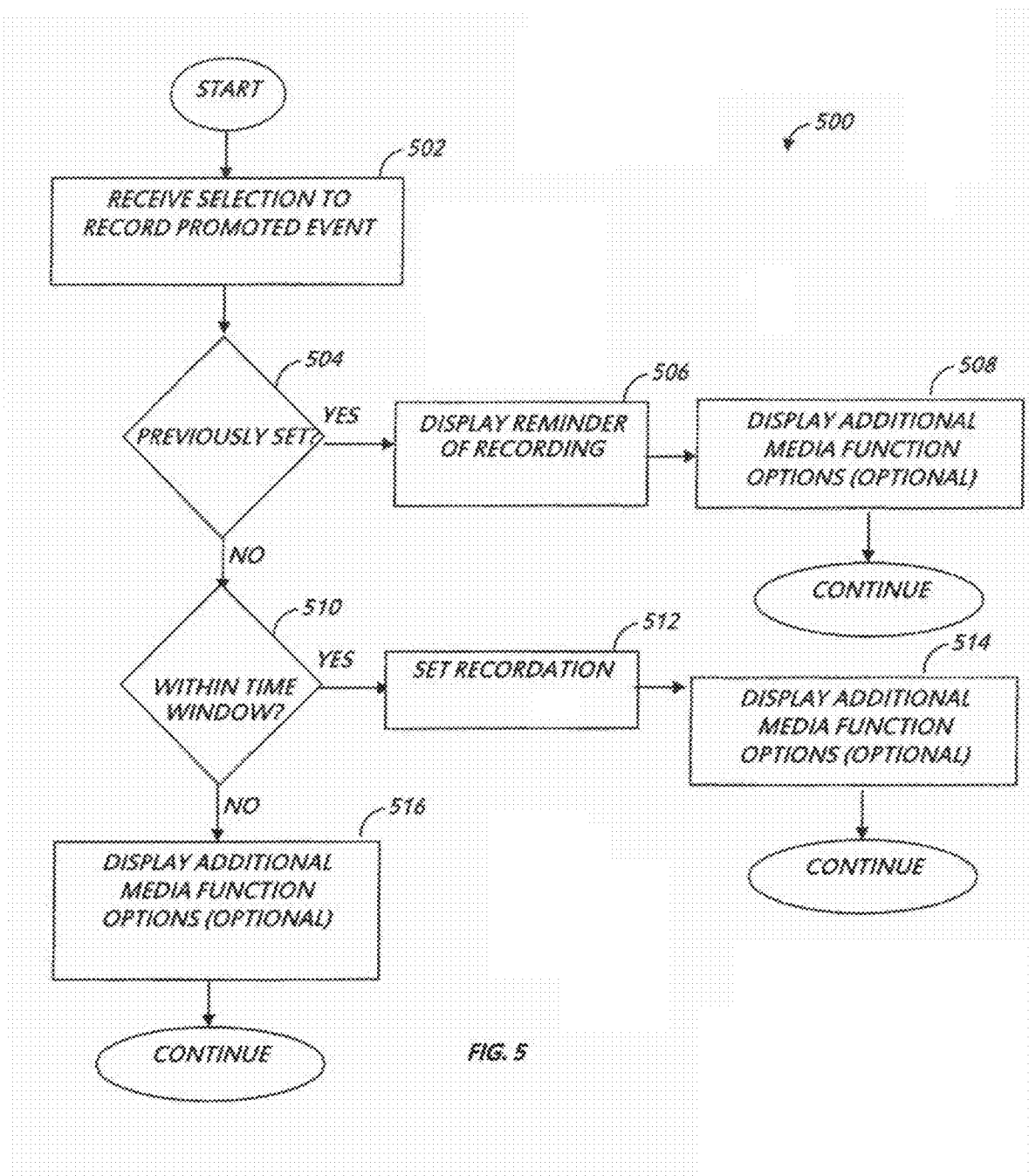
FIG. 5 is logical flow diagram illustrating an exemplary embodiment of a method for enabling a media functionality option for setting a recording.

FIG. 5 illustrates an exemplary method 500 for enabling a media functionality option for setting a recording. Per step 502, a request to record a promoted event is received at e.g., the RRR server 252 or media functionality server 202. The request is transmitted in response to a selection of an embedded trigger within a promotion as discussed herein. Next, per step 504, it is determined whether a recordation has been previously set for the promoted content by that viewer, and/or whether it is on that device or other devices in the home or network. In one embodiment, this is determined via information stored at a headend entity (such as e.g., the RRR server 252 and/or media functionality server 202). Alternatively, information stored at the device itself may be utilized.

If a recording has been previously scheduled, per step 506, a message reminding the viewer of the scheduled recording (including on which devices the recording is scheduled) is displayed (see e.g., FIG. 2b). Then, per step 508 of the method 500, additional media functionality options may be displayed. As noted previously, the additional options may include options to be reminded of the upcoming promoted content, options to cause one or more devices to automatically tune to a promoted event, options to cause additional devices to receive reminders, tuning signals, and/or recording signals, etc.

If a recording has not previously been scheduled, then at step 510 it is determined whether the current time is within a time window for setting a recording for the promoted content. As noted above a campaign management entity may establish one or more rules identifying a time value threshold after which a recording may no longer be set. The present system evaluates the current time against the time value threshold to make this determination. If the present time is within the allowable recordation window, then per step 512 the recordation is scheduled. Subsequent media options may optionally be displayed (step 514). If the present time is not within the allowable recordation window (i.e., is beyond the threshold), then per step 516 additional media options are displayed. For example, the system may "roll" the viewer to the next episode (i.e., enable the viewer to schedule a recording for the next episode).

When a recording is scheduled, the system ascertains whether series or single occurrence recording is appropriate. The system further identifies whether the recording should be of a standard definition (SD) or high definition (HD) version of the content. Information used for these determinations may be obtained from e.g., the campaign management entity, subscriber information server, and other network entities as discussed above. These decisions are based in one implementation on campaign configuration, settop box capabilities, the number of DVR settop boxes on the subscriber account, and/or the number of service addresses in the household.

The previously discussed configurable parameters indicate, in one embodiment, whether a single occurrence or multiple occurrences of content should be recorded. Additionally, user selections via the embedded triggers are utilized (information regarding these is stored at e.g., the RRR server 252 and/or media functionality entity 202). The system determines whether to record an SD or HD (where available) version of the content, in one embodiment according to the table of Appendix A hereto.

Figure 6:
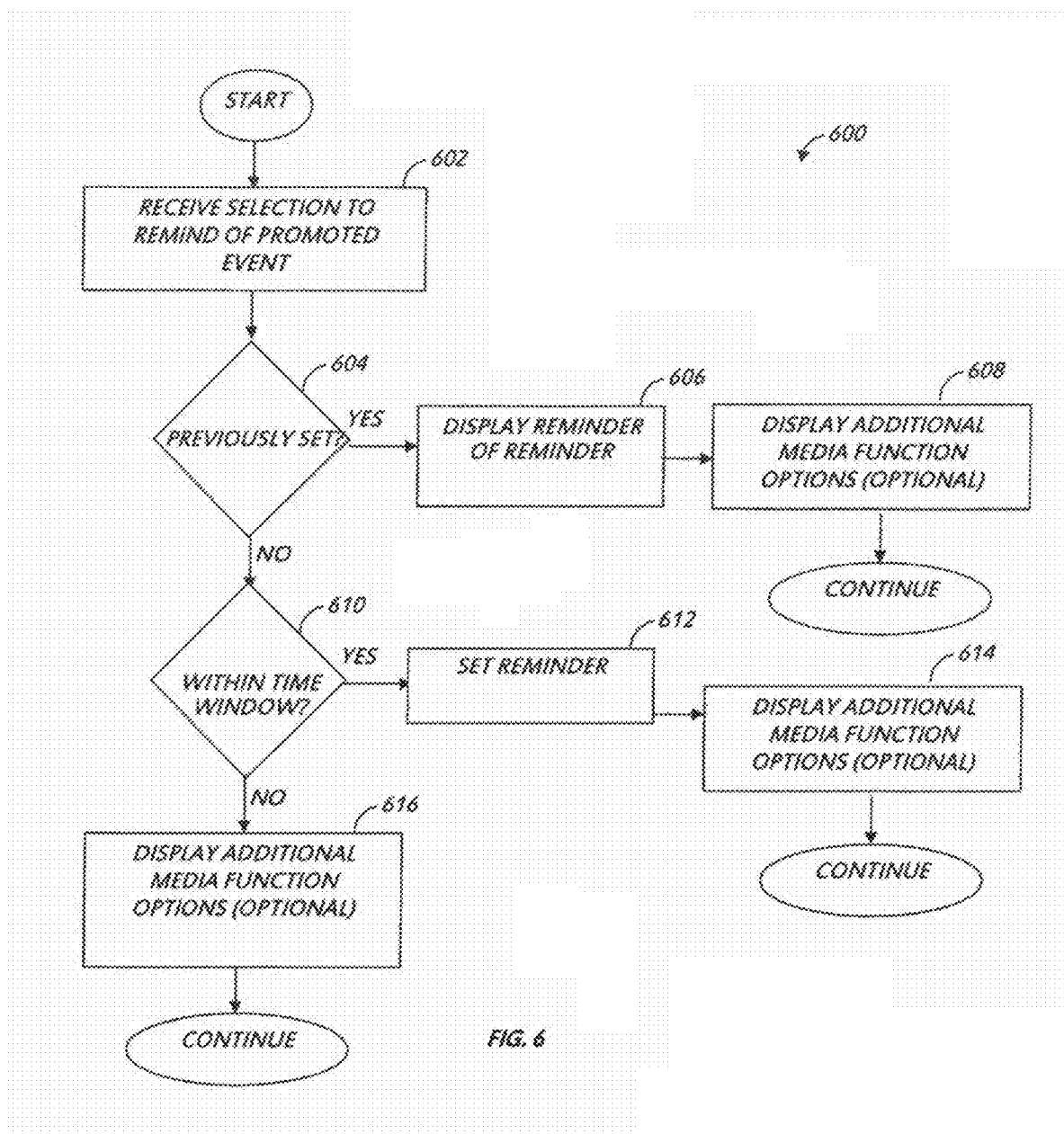
FIG. 6 is a logical flow diagram illustrating an exemplary embodiment of a method for enabling of a media functionality option for setting a reminder.

Referring now to FIG. 6, an exemplary method 600 for enabling a media functionality option for setting a reminder is illustrated. Per step 602, a selection of an embedded trigger indicating a request by a viewer to be reminded of a promoted event is received at e.g., the RRR server 252 and/or media functionality server 202. At step 604, it is determined whether a previous reminder for the promoted event has already been scheduled by that viewer and/or on that device or other devices in the home or network. If a reminder is already scheduled (as determined by information at the headend or provided from the device(s)), then a reminder of the scheduled reminder may be displayed to the user at step 606 (see e.g., FIG. 2b). Additional media functionality options may be available to the user and displayed per step 608. For example, the viewer may be prompted to record the promoted event, set a force-tune event, setting up media functions for episodic content, etc.

If a reminder has not been previously scheduled, then per step 610, it is determined whether the current time is within a time window for setting the reminder. As discussed above, one or more configurable parameters at the campaign manager or other promotion campaign-related entity may be provided to a user (i.e., network operator setting up a campaign) which enable the user to enter a time value threshold past which certain media functionality options may not be made available to a user. In one variant, this may include enabling the network operator to e.g., indicate that reminders will only be enabled up to, for example, 1 minute before a designated start time. The determination of step 610 may be performed for instance by comparing a current time to the designated start time of the promoted event and to the parameters listed for that promotion campaign at the campaign management entity.

If it is determined that the current time is within the time window, then the reminder is set (step 612). Additional media functionality options may be provided at step 614. For example, the viewer may next be able to set a recording of the promoted event and/or other additional events (such as where the content is episodic, where the content is identifiable by actor, genre, context, etc.), and/or may be able to set a force-tune event.

If it is determined that the current time is not within the time window for scheduling a reminder (i.e., the promoted event will occur sooner than is reasonable for providing a reminder as determined by the configurable parameters established for the campaign), then per step 616 alternative media functionality options are displayed. For example, the user may be prompted to tune immediately to the promoted content, record the promoted content, establish a forced tune event, and/or tune to, be reminded, and/or record subsequent iterations of the content.

Each of the media functionality options discussed herein may be selected for the requesting device and/or individual ones of devices associated to the requesting device.

Furthermore, with respect to each of the media functionality options discussed herein, it is appreciated that in the event of a resource conflict (i.e., there are not enough resources to accommodate a newly entered request), exemplary implementations of the present invention may provide an option to cancel one or more other services such as by displaying a list of the conflicting events and enabling the user to select one or more (based on the number of resources available to the user) for cancellation. Alternatively, the system may suggest other dates/times for the same or similar (such as in genre, actors, etc.) content which does not conflict.

Media Functionality Server—

Figure 7:
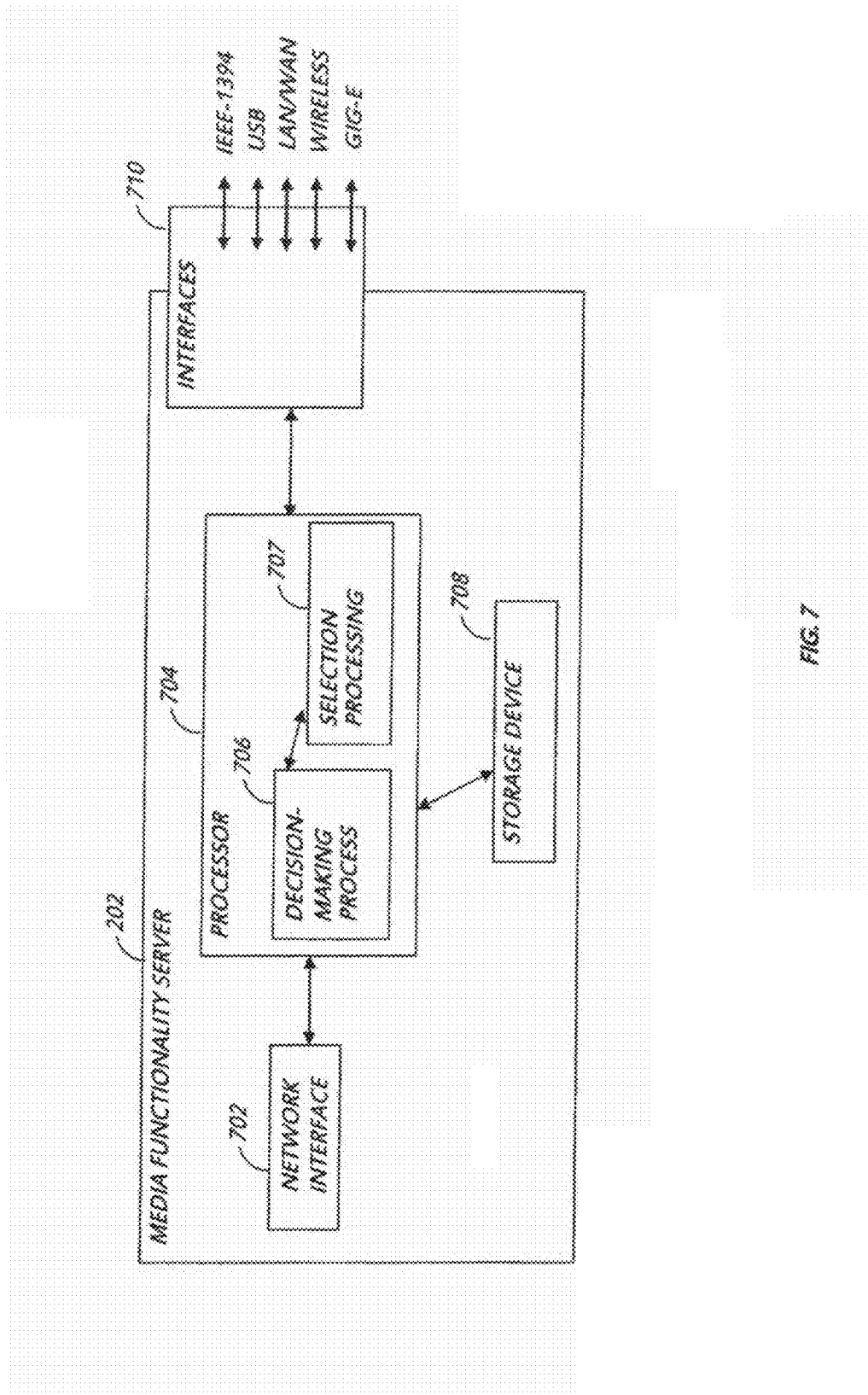
FIG. 7 is a functional block diagram illustrating an exemplary media functionality server for use in the present invention.

FIG. 7 illustrates one exemplary embodiment of a media functionality server 202 useful with the present invention. In one variant, the server 202 may include an RRR server 252 of the type discussed previously herein.

As shown, the server 202 generally comprises a network interface 702 for interfacing with the content delivery network 101, a processor 704, a storage apparatus 708, and a plurality of interfaces 710 for direct or indirect communication with e.g., the CPE 106, or other network entities. As discussed above, the other entities with which the server 202 may be in communication, as well as the media functionality server 202 itself may be located at a network headend 150, or another portion of the MSO network.

In the illustrated embodiment, the server 202 comprises at least a decision-making application 706 and a selection processing application 707 running on the processor 704 thereof. Although illustrated as individual applications 706 and 707 running on the server 202, it is appreciated that the foregoing functionalities may comprise an individual application, or alternatively one or more distributed applications running on a plurality of entities in data communication with one another (including one or more network entities).

The decision-making application 706 is configured to perform one or more tasks necessary for deciding which of a plurality of media functionality options to incorporate into a promotion. The methods of FIGS. 4-6 indicate various decision-making processes which may be performed by the decision-making application 706 of the server 202. For instance, the application 706 may be configured to determine whether a particular media functionality option has been previously selected by a viewer for the promoted event on that device, and/or other devices associated to the requesting device. In addition, the application 706 may be used to determine whether a request to record or schedule a reminder is received outside a relevant time threshold. Information for making the aforementioned decisions may be stored at the server 202 or pulled from one or more of a campaign management entity, a channel/program information entity, a subscriber information entity, a requesting device, etc.

Still further, the decision-making application 706 may be utilized to determine which media functionality options are appropriate for display given present circumstances. For instance, if it is determined that the promoted content comprises content which is immediately available (such as OD content or currently broadcast content), and a selection was received to record the content, the decision-making application 706 may determine to next display an option to record related content (such as other episodes or similar content), to tune to the content (immediately and/or in the future), and/or to remind the user of upcoming iterations of the same or similar content.

The selection processing application 707 is configured to process selection requests received from the CPE 106. As discussed throughout the present application, the CPE 106 are provided various promotions having selectable icons associated therewith. The user selects one or more of the icons which causes an embedded trigger therein to send a message to the server 202. The processing application 707 is configured to, upon receiving the aforementioned messages, process these to derive subsequent messages which are transmitted to other entities in the network. In one embodiment, the second messages comprise information useful in implementing a user's request, and providing additional functionality options. In addition, the processing application 707 may be configured to provide commands to the requesting device and one or more other devices associated therewith which e.g., cause these devices to record identified content, cause reminder messages to be displayed, cause the devices to tune to identified content, etc.

Additionally, the storage entity 708 may be utilized to store one or more versions of alternative text to be placed within various messages transmitted to the client devices. For instance the text portions of the messages displayed at e.g., FIG. 2b may be stored at the storage entity 708.

Insertion Management Entity—

Figure 8:
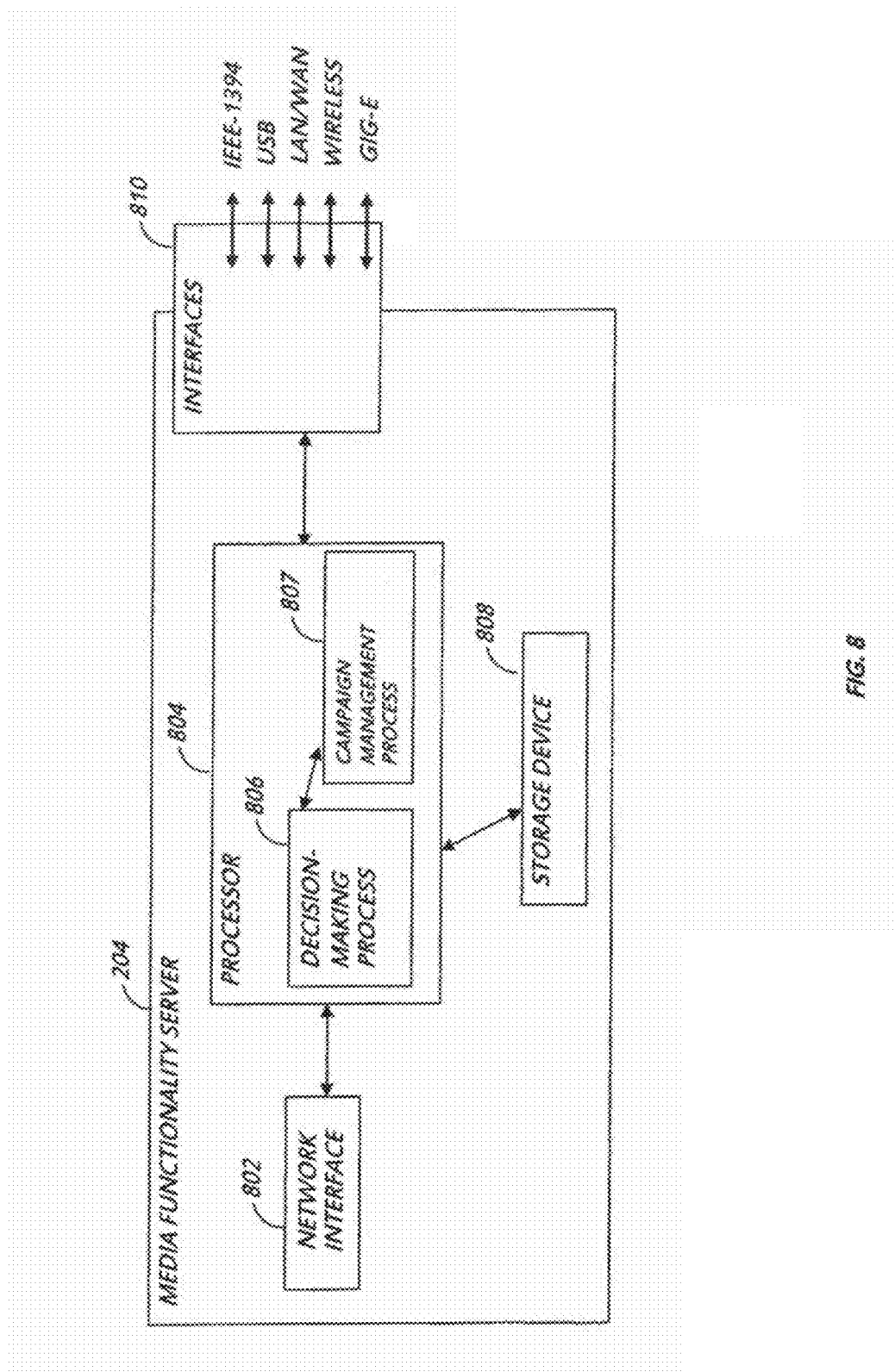
FIG. 8 is a functional block diagram illustrating an exemplary insertion management entity for use in the present invention.

FIG. 8 illustrates one exemplary embodiment of an insertion management entity 204 useful with the present invention. In one variant the insertion management entity 204 may comprise an ETAG entity 254 of the type discussed previously herein.

As shown in FIG. 8, the insertion management entity 204 generally comprises a network interface 802 for interfacing with the content delivery network 101, a processor 804, a storage apparatus 808 and a plurality of interfaces 810 for direct or indirect communication with e.g., the CPE 106, or other network entities. As discussed above, the other entities with which the insertion management entity 204 may be in communication, as well as the insertion entity 204 itself may be located at a network headend 150, or another portion of the MSO network.

In the illustrated embodiment, the insertion management entity 204 comprises at least a decision-making application 806 and a campaign management application 807 running on the processor 804 thereof. As noted above, although illustrated as individual applications 806 and 807 running on the insertion management entity 204, it is appreciated that the foregoing functionalities may comprise an individual application, or alternatively one or more distributed applications.

The decision-making application 806 is configured to perform one or more tasks necessary for deciding which of a plurality of media functionality options to incorporate into a promotion. The decision-making application 806 may work in connection with the decision-making application 706 of the media functionality server 202 (of FIG. 7), and assist in the performance of functions discussed above with respect thereto. Alternatively, only one of these entities may be selected to perform the various decision-making processes to be performed thereby (see e.g., FIGS. 4-7 and relevant discussion relating thereto). Information for making the aforementioned decisions may be stored at the insertion management entity 204 or pulled from one or more of a media functionality server, a channel/program information entity, a subscriber information entity, a requesting device, etc.

The campaign management application 807 is configured to process and implement configuration parameters selected by a network operator with respect to a given campaign. As discussed throughout the present application, the network operator is able to manage a campaign by e.g., setting a frequency of display of a particular promotion and/or the embedded triggers therein and establish various parameters for display of individual ones of media functionality options.

In one embodiment the campaign management application 807 may be of the type discussed in previously referenced, co-owned U.S. patent application Ser. Nos. 12/503,749 and 12/503,772, each previously incorporated herein by reference herein in its entirety. As discussed therein, the aforementioned apparatus and methods may be used for identifying, creating and distributing audience or viewer qualities to an advertisement management system and/or an advertisement decision maker. The data is provided in real time (or near real time) thereby enabling audience monitoring for all content, including inter alia, broadcast, VOD, and DVR content. This information may be useful in e.g., determining configuration parameters based on historical use, providing targeted opportunities for promotion insertion consistent with a campaign, etc.

Errors, Reporting, and Performance—

In exemplary embodiments of the invention, the success or failure of a user request for a particular media function or option is recorded/reported. Specifically, once the present system verifies that the function/option has been successfully implemented (i.e., a recording, reminder or tuning event scheduled or started), the system displays verification text or icons to the viewer indicating that the function was performed successfully, and whether or not it was performed on more than one STB associated with the requesting device (such as in the same household or registered to the same subscriber account). Additionally, information regarding the successful implementation of the media function is also stored at e.g., the media functionality server 202. In the event the media function is unsuccessfully implemented, an error message or indication is presented to the viewer. Where possible, a description of the error may also be provided to the viewer (e.g., scheduling conflict, etc.) or written to a data structure such as an error log file. In addition, information regarding the failure is also generated and stored at e.g., the media functionality server 202.

One or more campaign management entities may be used to identify data from ETAG originating from IAM messages coming from applications having embedded media functions to be used in generating records regarding system performance.

In one embodiment, the EBIF applications of the exemplary system are smaller (in megabytes) than a traditional two screen vote/poll EBIF application. It is further appreciated that the EBIF applications according to the present system may render within a given time period (such as e.g., three (3) seconds) from being triggered.

The present invention may be further utilized to support central configuration through simple portal(s) or GUI(s). For instance, in one implementation, up to 500,000 concurrent overlays may be employed for a single campaign. Several campaigns may be displayed or employed simultaneously.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

Appendix A
© Copyright 2012 Time Warner Cable, Inc. All rights reserved.
Matrix describing recording behavior

| Check Weather Overlay is displaying on HD channel | Check STB is connected to TV via HDMI Connection | Check How Many Service Addresses are on the Account | Record HD Version on STB with Overlay | Record SD Version on STB with Overlay | Record SD Version on all other DVR STBs on Account |
|---|---|---|---|---|---|
| Overlay is Displaying on HD Channel | | There is only one Service Address Associated with the Account | X | | X |
| Overlay is Displaying on HD Channel | | There is more than one Service Address Associated with the Account | X | | |
| Overlay is Displaying on SD Channel | STB is Connected to TV via HDMI connection | There is only one Service Address Associated with the Account | | X | X |
| Overlay is Displaying on SD Channel | STB is Connected to TV via HDMI connection | There is more than one Service Address Associated with the Account | | X | |

What is claimed is:

1. A computerized method for providing media functionality to a plurality of computerized user devices in communication with a content delivery network, the computerized method comprising:
   receiving data relating to a plurality of parameters, the plurality of parameters relating to a promotion campaign;
   utilizing at least the data to identify and insert one or more media function-enabling trigger data structures into a digital media stream for delivery of digitally rendered promotional content associated with the promotion campaign, at least one of the one or more media function-enabling trigger data structures comprising an option to cause scheduling of a recording for a digital program currently broadcasted to the plurality of computerized user devices over the content delivery network;
   based at least on the data relating to the plurality of parameters, determining a time value threshold, the time value threshold comprising a period of time after the digital program began broadcast, an end of the period of time comprising a particular time in which the recording for the currently broadcasted digital program cannot be scheduled;
   providing the digital media stream to at least one of the plurality of computerized user devices, the digital media stream comprising the digitally rendered promotional content and the at least one of the one or more media function-enabling trigger data structures;
   determining, based at least on a selection of the option to schedule the recording for the currently broadcasted digital program by a user of the at least one of the plurality of computerized user devices, that a then-current time of the selection meets or exceeds the time value threshold; and
   based at least on the determining that the then-current time of the selection meets or exceeds the time value threshold, automatically causing scheduling of a recording of a subsequent episode of the currently broadcasted digital program, the subsequent episode comprising a second digital program of a series to which the currently broadcasted digital program belongs, the second digital program being a different digital program than the currently broadcasted digital program.

2. The computerized method of claim 1, wherein the determining of the time value threshold comprises dynamically determining via using an algorithm and a context associated with the currently broadcasted digital program, the algorithm configured to analyze the currently broadcasted digital program to determine the context.

3. The computerized method of claim 2, further comprising utilizing the context to assess a position within the associated currently broadcasted digital program, the position comprising a position where the end of the period of time after the digital program began broadcast is set.

4. The computerized method of claim 1, further comprising providing one or more additional ones of the one or more media function-enabling trigger data structures to the at least one of the plurality of computerized user devices based at least in part on the selection of the option to schedule the recording for the currently broadcasted digital program by the user.

5. The computerized method of claim 4, wherein the one or more additional ones of the one or more media function-enabling trigger data structures comprise a function for causing the at least one of the plurality of computerized user devices to automatically tune to the subsequent episode of the currently broadcasted digital program at a time of the recording thereof.

6. The computerized method of claim 4, further comprising, based at least on the selection of the one or more additional ones of the one or more media function-enabling trigger data structures, enabling the at least one of the plurality of computerized user devices to execute, at another one of the plurality of computerized user devices, a media functionality option associated with the one or more additional ones of the one or more media function-enabling trigger data structures.

7. The computerized method of claim 6, wherein the execution of the media functionality option is configured to cause transmission of one or more reminders to the another one of the plurality of computerized user devices, the transmission of the one or more reminders recurring based on a recurrence of the digitally rendered promotional content.

8. The computerized method of claim 7, wherein the one or more reminders are associated to a time of availability of the digitally rendered promotional content.

9. The computerized method of claim 1, wherein:
   the content delivery network comprises a managed network having a plurality of subscribers;
   the plurality of parameters comprise one or more configurable rules entered by a network operator of the managed network; and the identification of the one or more media function-enabling trigger data structures is based at least in part on capabilities of the at least one of the plurality of computerized user devices, the capabilities determined at least in part based on data from a subscriber database maintained by the network operator, the database comprising data correlating ones of the plurality of computerized user devices with respective ones of the subscribers.

10. Computer readable apparatus comprising a non-transitory storage medium, the non-transitory medium comprising at least one computer program having a plurality of instructions, the instructions configured to, when executed on a processing apparatus:

receive data relating to a plurality of parameters, the plurality of parameters relating to a promotion campaign;

utilize at least the data relating to the plurality of parameters to identify and insert one or more media function-enabling trigger data structures into a digital media stream for delivery of digitally rendered promotional content associated with the promotion campaign, at least one of the one or more media function-enabling trigger data structures comprising one or more media functionality options;

based at least on the data relating to the plurality of parameters, determine a time value, the time value comprising a period of time after which a digital program began broadcast, the digital program being then-currently broadcasted to a plurality of computerized user devices over a content delivery network;

provide the digital media stream to at least one of the plurality of computerized user devices, the digital media stream comprising the digitally rendered promotional content and the at least one of the one or more media function-enabling trigger data structures;

determine, based at least on data relating to a selection of at least one of the one or more media functionality options by a user of the at least one of the one or more computerized user devices, that a then-current time of the selection meets or exceeds the time value; and based at least on the determination that the then-current time of the selection meets or exceeds the time value, automatically cause execution of the at least one of the one or more media functionality options;

wherein the determination of the time value comprises utilization of an algorithm, the algorithm configured to analyze at least metadata associated with the digital program while the digital program is broadcasted to the plurality of computerized user devices, the metadata comprising data indicative of a progress of at least one of (i) events, or (ii) a story line, of the digital program.

11. The computer readable apparatus of claim 10, wherein:

the one or more media functionality options comprise an option to schedule a recording for the currently broadcasted digital program;

the period of time after the digital program began broadcast comprises a period of time in which the recording for the currently broadcasted digital program can be scheduled; and the execution of the one or more media functionality options comprises an automatic scheduling of a recording of a subsequent episode of the currently broadcasted digital program.

12. The computer readable apparatus of claim 10, wherein:

the one or more media functionality options comprise an option enable the at least one of the one or more computerized user devices to immediately and automatically tune to the currently broadcasted digital program;

the period of time after the digital program began broadcast comprises a period of time in which the at least one of the one or more computerized user devices can tune to the currently broadcasted digital program; and the execution of the one or more media functionality options comprises an automatic causation of the at least one of the one or more computerized user devices to immediately and automatically tune to of a subsequent episode of the currently broadcasted digital program.

13. The computer readable apparatus of claim 10, wherein:

the one or more media functionality options comprise an option provide the at least one of the one or more computerized user devices with one or more reminders relating to the currently broadcasted digital program;

the period of time after the digital program began broadcast comprises a period of time in which the one or more reminders relating to the currently broadcasted digital program can be enabled; and the execution of the one or more media functionality options comprises provision, to the at least one of the one or more computerized user devices, of one or more reminders relating to a subsequent episode of the currently broadcasted digital program.

14. The computer readable apparatus of claim 10, wherein the algorithm is configured to analyze the metadata to determine context, the context useful in determination of the progress.

15. The computer readable apparatus of claim 14, wherein the determined context comprises a multi-period sporting event, and the determination of the progress comprises determination of which period of the multi-period sporting event is currently in progress.

16. A computerized server apparatus configured to provide a plurality of media functions to a plurality computerized client devices in data communication therewith, the computerized server apparatus comprising:

at least one first data interface for data communication with the plurality of computerized client devices;

a processor apparatus, the processor apparatus in data communication with the at least one first data interface; and a data storage device in data communication with the processor apparatus and comprising at least one computer program, the at least one computer program comprising a plurality of instructions configured to, when executed by the processor apparatus:

deliver promotion-related data to at least one of the plurality of computerized client devices, the promotion-related data comprising one or more embedded triggers associated with respective one or more media functionality options, the one or more media functionality options comprising options which may be selected by a user of the at least one of the plurality of computerized client devices with respect to a digital program associated with the promotion-related data;

receive data indicative of a selection of a first one of the one or more media functionality options from the at least one of the plurality of computerized client devices, the first one of the one or more media functionality options comprising an option to schedule at least one of (i) tuning, (ii) recording, or (iii) one or more reminders, for the digital program;

determine that the first one of the one or more media functionality options has previously been selected; and based on the determination, provide the user, via the at least one computerized client device, with at least one additional media functionality option, the at least one additional media functionality option enabling the user to schedule at least one of (i) tuning, (ii) recording, or (i) one or more reminders for a subsequent episode of a series to which the digital program belongs.

17. The computerized server apparatus of claim 16, wherein the at least one computer program is further configured to, when executed on the digital processor apparatus, cause provision to the user via the at least one computerized device, of a second additional media functionality option, the second additional media functionality option configured to enable the user schedule at least one of (i) tuning, (ii) recording, or (iii) reminders, for the digital program at a second one of the plurality of computerized client devices.

18. The computerized server apparatus of claim 16, wherein the delivery of the promotion-related data to at least one of the plurality of computerized client devices comprises delivery of the promotion-related data as part of a digital content stream of a virtual content channel, the digital content stream on the virtual program channel utilized to present data comprising a list of recommended digitally rendered content to the user.

19. The computerized server apparatus of claim 18, wherein the list of the recommended digitally rendered content is further based on data relating to one or more previous selections of the one or more media functionality options by the user, and the recommended digitally rendered content comprises at least one of:

a subsequent episode of a series to which the digital program belongs; and digitally rendered content having at least one of an actor, genre, or context in common with the digital program.

20. The computerized server apparatus of claim 18, wherein:

the list of the recommended digitally rendered content is presented to the user via the digital content stream on the virtual content channel and in conjunction with an electronic program guide (EPG), the EPG being personalized to the user; and the one or more media functionality options are presented to the user via a graphic display overlay rendered on a display device of the at least one computerized device and having one or more selectable virtual icons displayed thereon.

21. The computerized server apparatus of claim 18, wherein:

the digital content stream on the virtual content channel is configured to display digitally rendered content obtained from a plurality of content sources, the digital content stream being specifically personalized for the user based at least on data relating to at least one of (i) one or more preferences of the user, and (ii) at least one demographic of the user; and the digitally rendered content obtained from the plurality of content sources is selected for display according to a priority such that first available content is selected for presentation over second available content, the first available content being of greater interest to the user relative to the second available content.

22. The computerized server apparatus of claim 16, wherein the determination that the first one of the one or more media functionality options has previously been selected comprises determination that the first one of the options has been selected by a same one of the computerized client devices as the at least one of the plurality of computerized client devices.

23. The computerized server apparatus of claim 16, wherein the determination that the first one of the one or more media functionality options has previously been selected comprises determination that the first one of the options has been selected by the user, irrespective of which of the computerized client devices was used to make the previous selection.

* * * * *

UNITED STATES PATENT AND TRADEMARK OFFICE
CERTIFICATE OF CORRECTION

PATENT NO. : 10,051,305 B2
APPLICATION NO. : 15/483964
DATED : August 14, 2018
INVENTOR(S) : Justin Tidwell It is certified that error appears in the above-identified patent and that said Letters Patent is hereby corrected as shown below:

Currently reads (Claim 16 – Columns 36-37):
"16. A computerized server apparatus configured to provide a plurality of media functions to a plurality computerized client devices in data communication therewith, the computerized server apparatus comprising:
    at least one first data interface for data communication with the plurality of computerized client devices;
    a processor apparatus, the processor apparatus in data communication with the at least one first data interface; and
    a data storage device in data communication with the processor apparatus and comprising at least one computer program, the at least one computer program comprising a plurality of instructions configured to, when executed by the processor apparatus:
    deliver promotion-related data to at least one of the plurality of computerized client devices, the promotion-related data comprising one or more embedded triggers associated with respective one or more media functionality options, the one or more media functionality options comprising options which may be selected by a user of the at least one of the plurality of computerized client devices with respect to a digital program associated with the promotion-related data;
    receive data indicative of a selection of a first one of the one or more media functionality options from the at least one of the plurality of computerized client devices, the first one of the one or more media functionality options comprising an option to sched- Signed and Sealed this
Eleventh Day of December, 2018

Andrei Iancu
*Director of the United States Patent and Trademark Office* ule at least one of (i) tuning, (ii) recording, or (iii)
one or more reminders, for the digital program;
determine that the first one of the one or more media
functionality options has previously been selected;
and
based on the determination, provide the user, via the at
least one computerized client device, with at least
one additional media functionality option, the at least
one additional media functionality option enabling
the user to schedule at least one of (i) tuning, (ii)
recording, or (i) one or more reminders for a subsequent episode of a series to which the digital program belongs."

Should read:
--16. A computerized server apparatus configured to provide a plurality of media functions to a plurality computerized client devices in data communication therewith, the computerized server apparatus comprising:
  at least one first data interface for data communication
      with the plurality of computerized client devices;
  a processor apparatus, the processor apparatus in data
      communication with the at least one first data interface;
      and
  a data storage device in data communication with the
      processor apparatus and comprising at least one computer program, the at least one computer program
      comprising a plurality of instructions configured to,
      when executed by the processor apparatus:
      deliver promotion-related data to at least one of the
          plurality of computerized client devices, the promotion-related data comprising one or more embedded
          triggers associated with respective one or more
          media functionality options, the one or more media
          functionality options comprising options which may
          be selected by a user of the at least one of the
          plurality of computerized client devices with respect
          to a digital program associated with the promotion
          -related data;
      receive data indicative of a selection of a first one of the
          one or more media functionality options from the at
          least one of the plurality of computerized client
          devices, the first one of the one or more media
          functionality options comprising an option to schedule at least one of (i) tuning, (ii) recording, or (iii)
          one or more reminders, for the digital program;

determine that the first one of the one or more media functionality options has previously been selected; and based on the determination, provide the user, via the at least one computerized client device, with at least one additional media functionality option, the at least one additional media functionality option enabling the user to schedule at least one of (i) tuning, (ii) recording, or (iii) one or more reminders for a subsequent episode of a series to which the digital program belongs.--